US012724246B2

(12) United States Patent
Liu et al.

(10) Patent No.: US 12,724,246 B2
(45) Date of Patent: Sep. 1, 2026

(54) OPTICAL PATH FOLDING ELEMENT, IMAGING LENS MODULE AND ELECTRONIC DEVICE

(71) Applicant: LARGAN PRECISION CO., LTD., Taichung City (TW)

(72) Inventors: Ssu-Hsin Liu, Taichung City (TW); Chen Wei Fan, Taichung City (TW); Chien-Hsun Wu, Taichung City (TW); Wen-Yu Tsai, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 291 days.

(21) Appl. No.: 18/372,598

(22) Filed: Sep. 25, 2023

(65) Prior Publication Data

US 2024/0134167 A1 Apr. 25, 2024
US 2024/0231057 A9 Jul. 11, 2024

Related U.S. Application Data

(60) Provisional application No. 63/418,002, filed on Oct. 20, 2022.

(51) Int. Cl.

| | |
|---|---|
| ***G02B 13/00*** | (2006.01) |
| ***G02B 1/04*** | (2006.01) |
| ***G02B 1/115*** | (2015.01) |

(52) U.S. Cl.
CPC ........... *G02B 13/0065* (2013.01); *G02B 1/04* (2013.01); *G02B 1/115* (2013.01)

(58) Field of Classification Search
CPC ....... G02B 13/0065; G02B 1/04; G02B 1/115
(Continued)

(56) References Cited

U.S. PATENT DOCUMENTS 5,566,011 A * 10/1996 Steigerwald ...... G02F 1/133512 428/209
9,140,826 B2 9/2015 Miyazaki et al.
(Continued)

FOREIGN PATENT DOCUMENTS

CN 104280793 A 1/2015
CN 204389721 U 6/2015
(Continued)

OTHER PUBLICATIONS

TW Office Action dated Nov. 8, 2023 as received in Application No. 112131087.
(Continued)

*Primary Examiner* — William Choi
(74) *Attorney, Agent, or Firm* — Maschoff Brennan

(57) ABSTRACT

An optical path folding element includes a main body, a light absorption film layer and a matte structure. The main body has optical surface including an incident surface, a reflective surface and an emitting surface. A light enters into the optical folding element through the incident surface. The reflective surface reflects the light so as to change a traveling direction thereof. The light exits the optical folding element through the emitting surface. The light absorbing film layer is configured to reduce reflectance and provided adjacent to at least part of the optical surface, and the light absorbing film layer is in physical contact with the main body. The matte structure is disposed adjacent to at least part of the optical surface. The matte structure provides an undulating profile on a surface of the optical path folding element, and the matte structure is formed in one-piece with the main body.

55 Claims, 43 Drawing Sheets

(58) Field of Classification Search
USPC .......................................................... 359/726
See application file for complete search history.

(56) References Cited

U.S. PATENT DOCUMENTS

| | | | | |
|---|---|---|---|---|
| 9,316,810 | B2 | 4/2016 | Mercado | |
| 9,638,832 | B1 | 5/2017 | Su | |
| 9,952,361 | B2 | 4/2018 | Higuchi et al. | |
| 10,082,649 | B2 | 9/2018 | Park et al. | |
| 10,114,152 | B2 | 10/2018 | Chou | |
| 10,545,350 | B2 | 1/2020 | Terai et al. | |
| 11,106,018 | B2 | 8/2021 | Goldenberg et al. | |
| 11,256,164 | B2 | 2/2022 | Fu et al. | |
| 11,614,676 | B2 | 3/2023 | Chang et al. | |
| 11,656,456 | B2 | 5/2023 | Nakamura et al. | |
| 2006/0226432 | A1* | 10/2006 | Nemoto ................. | G11B 7/126 257/82 |
| 2015/0103226 | A1 | 4/2015 | Takahashi et al. | |
| 2016/0011415 | A1 | 1/2016 | Takada | |
| 2016/0231540 | A1 | 8/2016 | Mercado | |
| 2018/0081149 | A1 | 3/2018 | Bae et al. | |
| 2019/0243112 | A1 | 8/2019 | Yao et al. | |
| 2020/0064527 | A1 | 2/2020 | Shigemitsu et al. | |
| 2020/0073028 | A1 | 3/2020 | Shigemitsu et al. | |
| 2021/0041765 | A1 | 2/2021 | Shigemitsu et al. | |
| 2021/0063616 | A1 | 3/2021 | Seo et al. | |
| 2021/0063617 | A1 | 3/2021 | Yang et al. | |
| 2022/0082735 | A1 | 3/2022 | Yang et al. | |
| 2022/0163706 | A1 | 5/2022 | Feldman et al. | |
| 2022/0196993 | A1 | 6/2022 | Liao et al. | |
| 2022/0294945 | A1 | 9/2022 | Zhao et al. | |

FOREIGN PATENT DOCUMENTS

| | | | |
|---|---|---|---|
| CN | 105190390 | B | 7/2018 |
| CN | 108572424 | A | 9/2018 |
| CN | 106686285 | B | 11/2019 |
| CN | 110462458 | A | 11/2019 |
| CN | 211741813 | U | 10/2020 |
| CN | 112444896 | A | 3/2021 |
| CN | 112444897 | A | 3/2021 |
| CN | 112462453 | A | 3/2021 |
| CN | 110248067 | B | 4/2021 |
| CN | 112612071 | A | 4/2021 |
| CN | 213240573 | U | 5/2021 |
| CN | 114265270 | A | 4/2022 |
| EP | 2 669 718 | A1 | 12/2013 |
| IN | 207924229 | U | 9/2018 |
| IN | 214795271 | U | 11/2021 |
| TW | I693462 | B | 5/2020 |
| TW | I696858 | B | 6/2020 |
| TW | 202109090 | A | 3/2021 |
| TW | 202113424 | A | 4/2021 |
| TW | I762355 | B | 4/2022 |
| WO | 2011/006685 | A1 | 1/2011 |

OTHER PUBLICATIONS

TW Office Action dated Apr. 18, 2024 as received in Application No. 113100750.

Extended European Search Report dated Jun. 5, 2024 as received in Application No. 23203040.3.

IN Examination Report dated Feb. 23, 2026 in application No. 202334070208.

EP Examination Report dated Feb. 24, 2026 in application No. 23203040.3.

* cited by examiner 3212
3211
320
39e

OPTICAL PATH FOLDING ELEMENT, IMAGING LENS MODULE AND ELECTRONIC DEVICE

RELATED APPLICATIONS

This application claims priority to U.S. Provisional Application 63/418,002, filed on Oct. 20, 2022, which is incorporated by reference herein in its entirety.

BACKGROUND

Technical Field

The present disclosure relates to an optical path folding element, an imaging lens module and an electronic device, more particularly to an optical path folding element and an imaging lens module applicable to an electronic device.

Description of Related Art

With the development of technology, featuring high image quality becomes one of the indispensable features of an optical lens nowadays. Furthermore, electronic devices equipped with optical lenses are trending towards multi-functionality for various applications, and therefore the functionality requirements for the optical systems have been increasing.

However, conventional optical lenses are difficult to meet the requirements of high imaging quality of an electronic device under diversified development in recent years, especially non-imaging reflected light inside an optical lens with optical path folding configuration, which leads poor optical quality. In a known optical lens with optical path folding configuration, non-imaging reflected light is easily to be generated due to conventional configuration, and therefore it is difficult to meet progressive market requirements in optical quality nowadays. Therefore, how to improve the components and the configuration inside an optical lens to prevent generating non-imaging reflected light for meeting the requirement of high-end-specification electronic devices is an important topic in this field nowadays.

SUMMARY

According to one aspect of the present disclosure, an optical path folding element includes a main body, a light absorption film layer and a matte structure. The main body has an optical surface including an incident surface, a reflective surface and an emitting surface. A light enters into the optical path folding element through the incident surface. The reflective surface is configured to reflect the light so as to change a traveling direction thereof. The light exits the optical path folding element through the emitting surface. The light absorption film layer is configured to reduce reflectance. The light absorption film layer is disposed adjacent to at least part of the optical surface, and the light absorption film layer is in physical contact with the main body of the optical path folding element. The matte structure is disposed adjacent to at least part of the optical surface. The matte structure provides an undulating profile on a surface of the optical path folding element, and the matte structure is formed in one-piece with the main body of the optical path folding element.

According to another aspect of the present disclosure, an optical path folding element includes a main body and a light absorption film layer. The main body has an optical surface including an incident surface, a reflective surface and an emitting surface. A light enters into the optical path folding element through the incident surface. The reflective surface is configured to reflect the light so as to change a traveling direction thereof. The light exits the optical path folding element through the emitting surface. The light absorption film layer is configured to reduce reflectance. The light absorption film layer is disposed adjacent to at least part of the optical surface, and the light absorption film layer is in physical contact with the main body of the optical path folding element. The light absorption film layer includes a first anti-reflective film and a light absorbing film that are arranged in sequence on the optical surface along a direction away from the main body. The first anti-reflective film is configured to reduce reflectance. The light absorbing film includes a metal layer, and a primary element of the metal layer is chromium (Cr).

According to further another aspect of the present disclosure, an optical path folding element includes a main body and a light absorption film layer. The main body has a reflective surface configured to reflect a light so as to change a traveling direction thereof. The light absorption film layer is configured to reduce reflectance. The light absorption film layer is disposed adjacent to at least part of the reflective surface, and the light absorption film layer is in physical contact with the main body of the optical path folding element. The light absorption film layer includes a light absorbing film, and the light absorbing film includes a metal layer and a metal oxide layer. A primary element of the metal layer is Cr. A primary element of the metal oxide layer is represented by $MO_y$, wherein M is any one of tantalum (Ta), titanium (Ti) and Cr, and y satisfies the following condition: $y \leq 1$.

According to still further another aspect of the present disclosure, an optical path folding element includes a main body and a matte structure. The main body has an optical surface including an incident surface, a reflective surface and an emitting surface. A light enters into the optical path folding element through the incident surface. The reflective surface is configured to reflect the light so as to change a traveling direction thereof. The light exits the optical path folding element through the emitting surface. The matte structure is disposed adjacent to at least part of the optical surface so as to provide an undulating profile on a surface of the optical path folding element, and the matte structure is formed in one-piece with the main body of the optical path folding element. At least part of the optical surface has a step structure at edge thereof, and the step structure provides a convex shape or a concave shape on the optical surface with respect to a region proximal to the optical surface.

According to still further another aspect of the present disclosure, an imaging lens module includes one of the aforementioned optical path folding elements, a first lens element assembly and an image surface. The first lens assembly is disposed at an object side of the optical path folding element, and the first lens assembly includes a first lens element and a first light blocking element. The first lens element includes a first optically effective portion through which the light passes. The first light blocking element has a first light passing aperture disposed corresponding to the optical path folding element, and the light passes through the first light passing aperture. The image surface is configured to receive the light. The first light passing aperture is a smallest light passing aperture in the first lens assembly. When a minimum size of the first light passing aperture is $\varphi 1$, and a shortest vertical distance between the first light passing aperture and the optical path folding element is D1, the following condition is satisfied: $0.2 \leq \varphi 1/(D1+1) \leq 9$.

According to still further another aspect of the present disclosure, an electronic device includes the aforementioned imaging lens module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
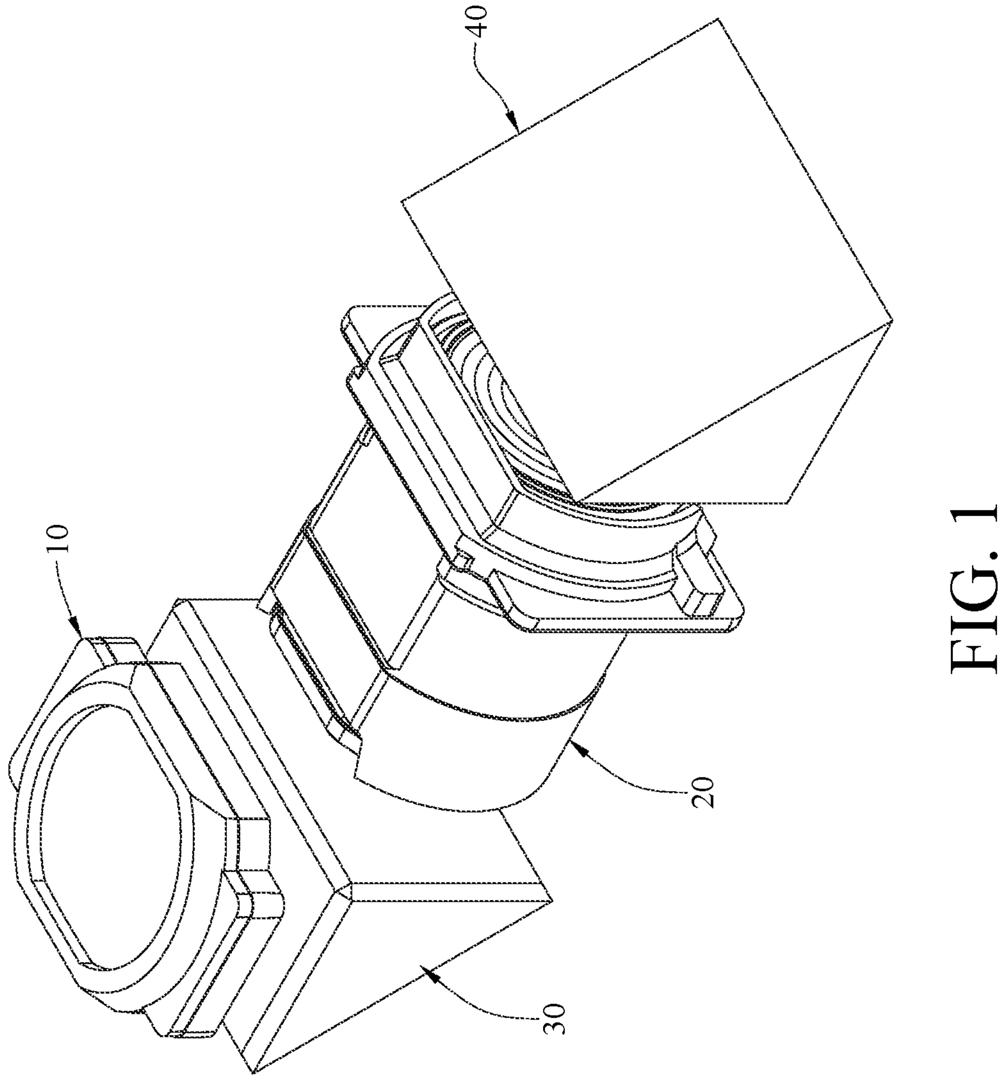
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One aspect of the present disclosure provides an optical path folding element applicable to an imaging lens module and an electronic device. The optical path folding element is favorable for flexible space configuration so as to reduce the size of the imaging lens module.

A main body of the optical path folding element can be a prism or a reflective mirror. The main body can have an optical surface, and the optical surface can include an incident surface, a reflective surface and an emitting surface. A light enters into the optical path folding element through the incident surface. The reflective surface is configured to reflect the light so as to change a traveling direction thereof.

The light exits the optical path folding element through the emitting surface. The reflective surface can be coated with a reflective film for light reflection, and the reflective film can include aluminum. Moreover, an anti-reflective treatment can be applied to the incident surface and the emitting surface. For example, a lamination of a layer with high refractive index and another layer with low refractive index alternatively arranged can be applied thereto, or a moth-eye anti-reflective structure with gradual refractive index change can be applied thereto. However, the present disclosure is not limited to the aforementioned anti-reflective treatments.

The optical path folding element can include a light absorption film layer configured to reduce reflectance. The light absorption film layer is disposed adjacent to at least part of the optical surface, and the light absorption film layer is in physical contact with the main body of the optical path folding element. The light absorption film layer can define an area of the reflective surface and reduce stray light. Moreover, the light absorption film layer of the optical path folding element can be disposed adjacent to the reflective surface. Therefore, it is favorable for reducing stray light generated around the reflective surface.

The optical path folding element can include a matte structure. The matte structure is disposed adjacent to at least part of the optical surface. The matte structure provides an undulating profile on a surface of the optical path folding element, and the matte structure is formed in one-piece with the main body of the optical path folding element. The light absorption film layer can be disposed on the matte structure. The undulating profile is favorable for disrupting the reflection of stray light. Moreover, the matte structure of the optical path folding element can be disposed adjacent to the reflective surface. Therefore, it is favorable for reducing stray light generated around the reflective surface.

According to the present disclosure, the undulating profile provided by the matte structure can include concave and convex portions arranged at regular or irregular intervals. For example, the matte structure can include striped or tapered projections or depressions which are regularly arranged, or can be a frosted surface having irregularly arranged structures. The present disclosure is not limited to the specific form of the matte structure. The matte structure with regularly arranged concave and convex portions is favorable for stable quality.

The light absorption film layer can include a light absorbing film. The light absorbing film can include a metal layer, and a primary element of the metal layer is Cr. The light absorbing film can be presented in dark colors and absorb visible light to reduce reflectance.

The light absorbing film can further include a metal oxide layer so as to improve matting properties of the light absorbing film. The metal layer and the metal oxide layer of the light absorbing film can be alternately laminated with one another. A primary element of the metal oxide layer can be represented by $MO_y$, where M is any one of Ta, Ti and Cr, and y can satisfy the following condition: $y \leq 1$.

The light absorption film layer of the optical path folding element can further include a first anti-reflective film. The first anti-reflective film is configured to reduce reflectance. The first anti-reflective film can prevent the reflection of stray light inside the optical path folding element. For example, the first anti-reflective film can include a first high refractive layer and a first low refractive layer. The first high refractive layer has higher refractive index than the first low refractive layer, and the first high refractive layer is alternately laminated with the first low refractive layer. A primary element of the first high refractive layer can be titanium oxide ($TiO_2$), and a primary element of the first low refractive layer can be silicon oxide ($SiO_2$). The first anti-reflective film reduces reflectance by the principle of thin-film interference. Therefore, it is favorable for preventing the reflection of stray light inside the optical path folding element. Moreover, the first anti-reflective film and the light absorbing film of the light absorption film layer can be arranged in sequence on the optical surface along a direction away from the optical path folding element. In other words, the first anti-reflective film is close to the main body of the optical path folding element with respect to the light absorbing film.

The light absorption film layer of the optical path folding element can further include an interlayer. The interlayer can be disposed between the first anti-reflective film and the light absorbing film. The interlayer can have the same primary element as the first high refractive layer or the first low refractive layer. Therefore, it is favorable for improving connection stability of the light absorbing film. Moreover, a primary element of the interlayer can be $SiO_2$.

The light absorption film layer of the optical path folding element can further include a second anti-reflective film. The second anti-reflective film can be far away from the main body of the optical path folding element with respect to the light absorbing film, and the second anti-reflective film can include a second high refractive layer and a second low refractive layer. The second high refractive layer has higher refractive index than the second low refractive layer, and the second high refractive layer can be alternately laminated with the second low refractive layer. A primary element of the second high refractive layer can be $TiO_2$, and a primary element of the second low refractive layer can be $SiO_2$. The second anti-reflective film can prevent the reflection of stray light at an outer surface of the optical path folding element, and can be served as a protective layer for preventing oxidation of the light absorbing film.

The optical path folding element can be made of plastic. Therefore, it is favorable for mass production.

At least part of the optical surface of the optical path folding element can have a step structure at an edge thereof. The step structure provides a convex shape or a concave shape on the optical surface with respect to a region proximal to the optical surface. The step structure is favorable for improving the molding quality of the optical surface. Please refer to FIG. 9, FIG. 14 and FIG. 23 which show a step structure 314.

An edge profile of the optical surface of the optical path folding element can have a plurality of protrusions. Moreover, an edge profile of any one of the incident surface, the reflective surface and the emitting surface can have the plurality of protrusions. The protrusions provide an extension of part of the edge profile of the optical surface in a direction away from a center of the optical surface. Therefore, it is favorable for improving image quality. Moreover, the edge profile of the reflective surface can have a plurality of protrusions, and the protrusions provide an extension of part of the edge profile of the reflective surface in a direction away from a center of the reflective surface. Please refer to FIG. 13, FIG. 14 and FIG. 17 which show a plurality of protrusions 315 and 316, respectively.

The optical path folding element can further include a second reflective surface. The second reflective surface is configured to reflect the light so as to change the traveling direction thereof. Therefore, it is favorable for the miniaturization of the imaging lens module.

Another aspect of the present disclosure provides an imaging lens module including the aforementioned optical path folding element, a first lens assembly and an image surface. The first lens assembly is disposed at an object side of the optical path folding element, and the first lens assembly includes a first lens element and a first light blocking element. The first lens element includes a first optically effective portion which the light can pass through. The first light blocking element has a first light passing aperture disposed corresponding to the optical path folding element, and the light can pass through the first light passing aperture. The first light passing aperture is a smallest light passing aperture in the first lens assembly. The image surface is configured to receive the light coming from the optical path folding element. The first light blocking element can be an opaque component with light passing aperture, such as a barrel, a light blocking sheet, a spacer or a retainer.

In the imaging lens module of the present disclosure, when a minimum size of the first light passing aperture is $\varphi 1$, and a shortest vertical distance between the first light passing aperture and the optical path folding element is D1, the following condition is satisfied: $0.2 \leq \varphi 1/(D1+1) \leq 9$. Therefore, it is favorable for blocking stray light effectively. Please refer to FIG. 3, FIG. 21 and FIG. 31 which show the parameters of $\varphi 1$ and D1.

According to the present disclosure, the imaging lens module can further include a second lens assembly. The second lens assembly is disposed at an image side of the optical path folding element, and the second lens assembly include a second lens element and a second light blocking element. The second lens element includes a second optically effective portion which the light can pass through. The second light blocking element has a second light passing aperture disposed corresponding to the optical path folding element, and the light can pass through the second light passing aperture. The second light passing aperture is a smallest light passing aperture in the second lens assembly. The second light blocking element can be an opaque component with light passing aperture, such as a barrel, a light blocking sheet, a spacer or a retainer. The second lens assembly is movable with respect to the image surface so as to provide optical image stabilization or auto focusing functionality for the imaging lens module. Since the imaging lens module including the optical path folding element may have longer optical path, multiple light blocking contributed by the first light blocking element, the light absorption film layer and the second light blocking element can reduce the possibility of stray light reaching the image surface.

In the imaging lens module of the present disclosure, when a minimum size of the second light passing aperture is $\varphi 2$, and a shortest vertical distance between the second light passing aperture and the optical path folding element is D2, the following condition can be satisfied: $0.3 \leq \varphi 2/(D2+1) \leq 12$. Therefore, it is favorable for blocking stray light. Please refer to FIG. 3 and FIG. 31 which show the parameters of $\varphi 2$ and D2.

According to the present disclosure, the imaging lens module can further include a second optical path folding element. The second optical path folding element is disposed at an image side of the second lens assembly. The second optical path folding element is configured to reflect the light toward the image surface. The optical path folding elements deflect the optical path many times so as to be favorable for the miniaturization of the imaging lens module. Moreover, the second optical path folding element can also include a light absorption film layer. When the imaging lens module includes multiple optical path folding elements, the light absorption film layer can be provided on the optical path folding element close to the lens assembly.

Further another aspect of the present disclosure provides an electronic device including the aforementioned optical path folding element.

According to the present disclosure, said "primary element" of an object refers to the percentage by weight of this element in this object is greater than 50 wt %. For example, when it is described that the light absorbing film of the light absorption film layer includes the metal layer, and the primary element of the metal layer is Cr, it represents the percentage by weight of Cr in the metal layer is greater than 50 wt %, e.g. the metal layer is an alloy of 60 wt % Cr and 40 wt % nickel.

According to the present disclosure, the aforementioned features and conditions can be utilized in numerous combinations so as to achieve corresponding effect.

According to the above description of the present disclosure, the following specific embodiments are provided for further explanation.

1st Embodiment

Figure 2:
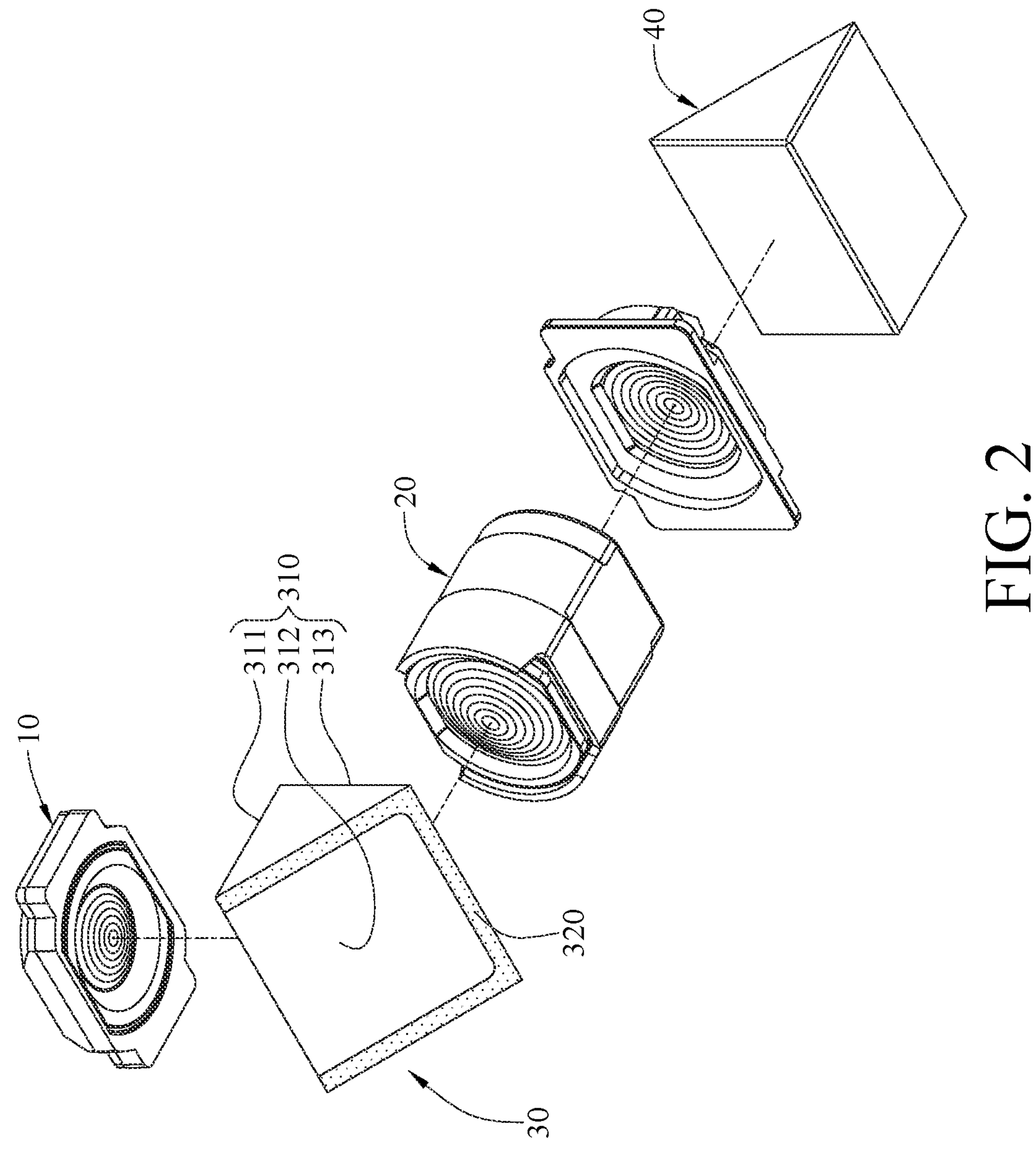
FIG. 2 is an exploded view of the imaging lens module in FIG. 1.
Figure 3:
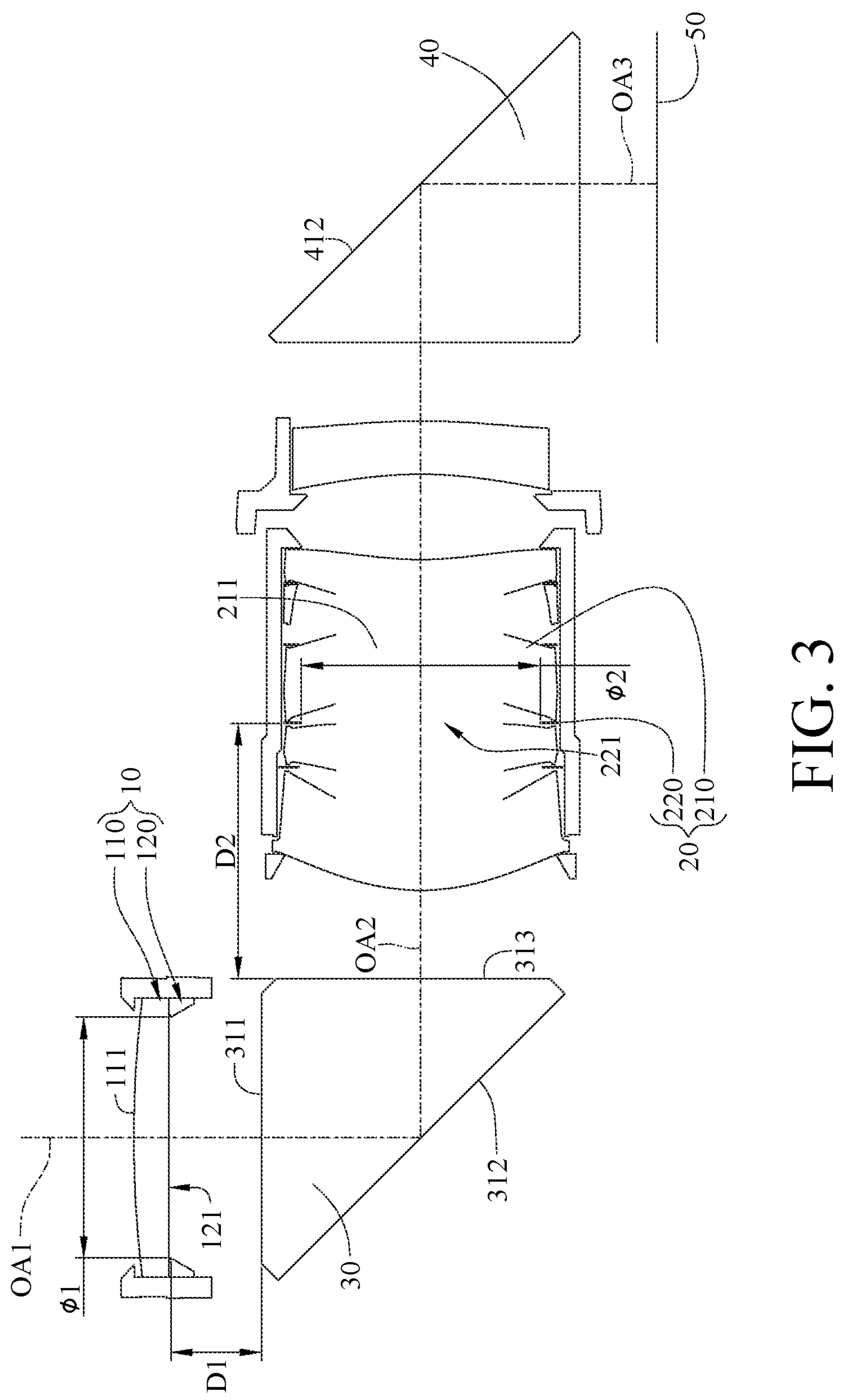
FIG. 3 is a cross-sectional view of the imaging lens module in FIG. 1.
Figure 4:
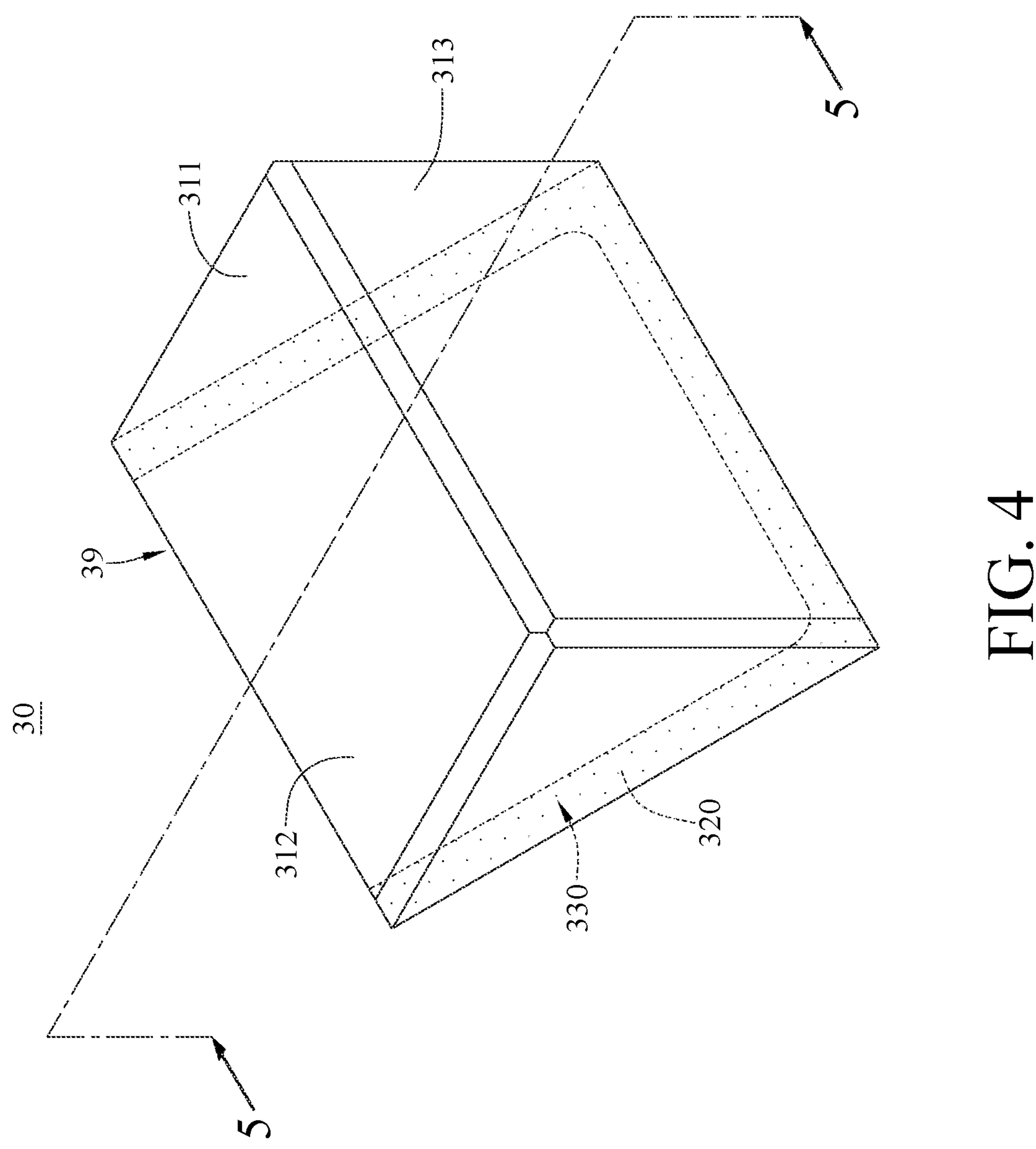
FIG. 4 is a perspective view of an optical path folding element of the imaging lens module in FIG. 1.
Figure 5:
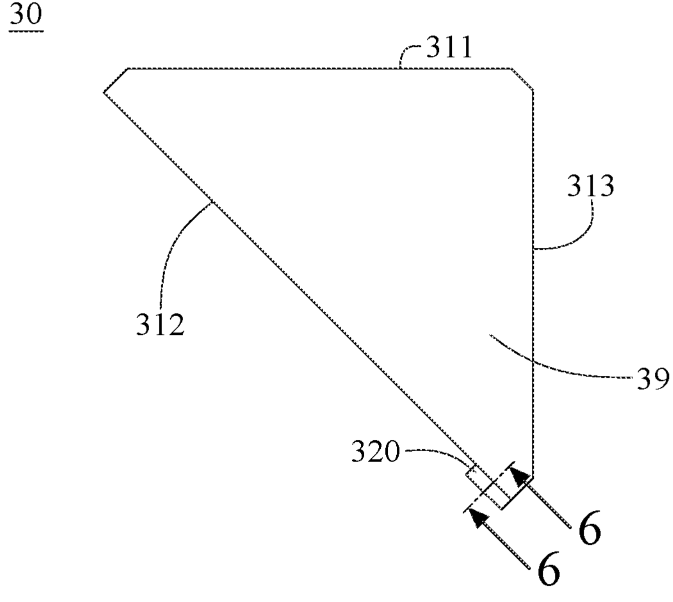
FIG. 5 is a cross-sectional view of the optical path folding element sectioned along line 5-5 in FIG. 4.
Figure 6:
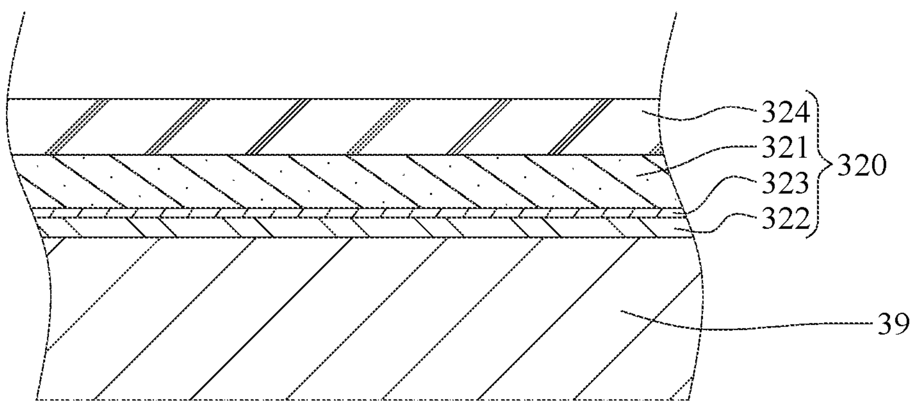
FIG. 6 is a cross-sectional view of the optical path folding element sectioned along line 6-6 in FIG. 5.

Please refer to FIG. 1 through FIG. 6, where FIG. 1 is a perspective view of an imaging lens module according to the 1 st embodiment of the present disclosure, FIG. 2 is an exploded view of the imaging lens module in FIG. 1, FIG. 3 is a cross-sectional view of the imaging lens module in FIG. 1, FIG. 4 is a perspective view of an optical path folding element of the imaging lens module in FIG. 1, FIG. 5 is a cross-sectional view of the optical path folding element sectioned along line 5-5 in FIG. 4, and FIG. 6 is a cross-sectional view of the optical path folding element sectioned along line 6-6 in FIG. 5. For the purpose of clear illustration, some components have been omitted or simplified in the drawings.

In this embodiment, an imaging lens module 1 includes, in order from an object side to an image side along an optical path, a first lens assembly 10, an optical path folding element 30, a second lens assembly 20, a second optical path folding element 40 and an image surface 50.

The first lens assembly 10 is disposed at an object side of the optical path folding element 30. The first lens assembly 10 includes a first lens element 110 and a first light blocking element 120. FIG. 3 shows single first lens element 110, but the present is not limited to the number of the first lens element 110. The first lens element 110 includes a first optically effective portion 111, and the light can pass through the first optically effective portion 111. The first light blocking element 120 is, for example but not limited to, a retainer having a first light passing aperture 121. The first light blocking element 120 can also be an opaque component, such as a barrel, a light shielding sheet and a spacer. The first light passing aperture 121 is disposed corresponding to the optical path folding element 30, and the light can pass through the first light passing aperture 121. The first light passing aperture 121 is a smallest light passing aperture in the first lens assembly 10.

The second lens assembly 20 is disposed at an image side of the optical path folding element 30. The second lens assembly 20 includes a second lens element 210 and a second light blocking element 220. FIG. 3 shows multiple second lens elements 210, but the present is not limited to the number of the second lens element 210. Each of the second lens elements 210 includes a second optically effective portion 211, and the light can pass through the second optically effective portion 211. The second light blocking element 220 is, for example but not limited to, a light blocking sheet, and the second light blocking element 220 has a second light passing aperture 221. The second light blocking element 220 can also be an opaque component, such as a barrel, a light shielding sheet and a spacer. The second light passing aperture 221 is disposed corresponding to the optical path folding element 30, and the light can pass through the second light passing aperture 221. The second light passing aperture 221 is a smallest light passing aperture in the second lens assembly 20. The second lens assembly 20 is movable with respect to the image surface 50 so as to provide optical image stabilization or auto focusing functionality for the imaging lens module 1.

The optical path folding element 30 is disposed between the first lens assembly 10 and the second lens assembly 20. More specifically, the optical path folding element 30 can include a main body 39 served as a glass prism disposed at an image side of the first lens assembly 10 and an object side of the second lens assembly 20. The main body 39 has an optical surface 310, and the optical surface 310 includes an incident surface 311, a reflective surface 312 and an emitting surface 313. The light enters into the optical path folding element 30 through the incident surface 311. The reflective surface 312 is configured to reflect the light so as to change a traveling direction thereof. The light exits the optical path folding element 30 through the emitting surface 313.

In this embodiment, the optical path folding element 30 further includes a light absorption film layer 320 configured to reduce reflectance. The light absorption film layer 320 is disposed adjacent to at least part of the optical surface 310, and the light absorption film layer 320 is in physical contact with the main body 39 of the optical path folding element 30. In detail, the light absorption film layer 320 is disposed adjacent to the reflective surface 312 of the optical surface 310, and the light absorption film layer 320 is in physical contact with surfaces of the main body 39 other than the optical surface 310.

In this embodiment, the light absorption film layer 320 includes a light absorbing film 321. The light absorbing film 321 includes a metal layer, and a primary element of the metal layer is Cr. The light absorbing film 321 can be dark in appearance and can absorb visible light.

In this embodiment, the light absorption film layer 320 further includes a first anti-reflective film 322. As shown in FIG. 6, the first anti-reflective film 322 is close to the main body 39 of the optical path folding element 30 with respect to the light absorbing film 321. The first anti-reflective film 322 includes a first high refractive layer and a first low refractive layer, and the first high refractive layer is alternately laminated with the first low refractive layer. A primary element of the first high refractive layer can be $TiO_2$, and a primary element of the first low refractive layer can be $SiO_2$.

In this embodiment, the light absorption film layer 320 further includes an interlayer 323. As shown in FIG. 6, the interlayer 323 is disposed between the first anti-reflective film 322 and the light absorbing film 321. The interlayer 323 has the same primary element as the first high refractive layer or the first low refractive layer.

In this embodiment, the light absorption film layer 320 further includes a second anti-reflective film 324. As shown in FIG. 6, the second anti-reflective film 324 is far away from the main body 39 of the optical path folding element 30 with respect to the light absorbing film 321. The second anti-reflective film 324 includes a second high refractive layer and a second low refractive layer, and the second high refractive layer is alternately laminated with the second low refractive layer. A primary element of the second high refractive layer can be $TiO_2$, and a primary element of the second low refractive layer can be $SiO_2$.

In this embodiment, the optical path folding element 30 further includes a matte structure 330, and the matte structure 330 is disposed adjacent to at least part of the optical surface 310. The matte structure 330 provides an undulating profile on a surface of the optical path folding element 30, and the matte structure 330 is formed in one-piece with the main body 39 of the optical path folding element 30. In this embodiment, the matte structure 330 includes concave and convex portions arranged at irregular intervals, such as a frosted surface. The light absorption film layer 320 is disposed on the matte structure 330, and the light absorption film layer 320 as well as the matte structure 330 are disposed adjacent to the reflective surface 312 of the optical surface 310.

The second optical path folding element 40 is disposed at an image side of the second lens assembly 20, and is configured to reflect the light toward the image surface 50 so as to change the traveling direction thereof. As shown in FIG. 3, the optical path passes along a first optical axis OA1 through the first lens assembly 10 and the incident surface 311 of the optical path folding element 30 to thereby reach the reflective surface 312. The optical path is deflected off the reflective surface 312 and then passes along a second optical axis OA2. The optical path passes along the second optical axis OA2 through the emitting surface 313 and the second lens assembly 20 to thereby reach a reflective surface 412 of the second optical path folding element 40. The optical path is deflected off the reflective surface 412 and then passes along a third optical axis OA3. The optical path exits the second optical path folding element 40 along the third optical axis OA3 and then reaches the image surface 50.

FIG. 1 through FIG. 3 show no light absorption film layer on an optical surface of second optical path folding element 40, but the present disclosure is not limited thereto. In some other embodiments, an optical surface of the second optical path folding element, such as the reflective surface 412, can be provided with a light absorption film layer.

In the first lens assembly 10 of this embodiment, when a minimum size of the first light passing aperture 121 is $\varphi 1$, and a shortest vertical distance between the first light passing aperture 121 and the optical path folding element 30 is D1, the following condition is satisfied: $\varphi 1=4.82$ millimeters (mm); $D1=1.81$ mm; and $\varphi 2/(D1+1)=1.72$.

In the second lens assembly 20 of this embodiment, when a minimum size of the second light passing aperture 221 is $\varphi 2$, and a shortest vertical distance between the second light passing aperture 221 and the optical path folding element 30 is D2, the following condition is satisfied: $\varphi 2=4.79$ mm; $D2=5.1$ mm; and $\varphi 2/(D2+1)=0.79$.

2nd Embodiment

Figure 7:
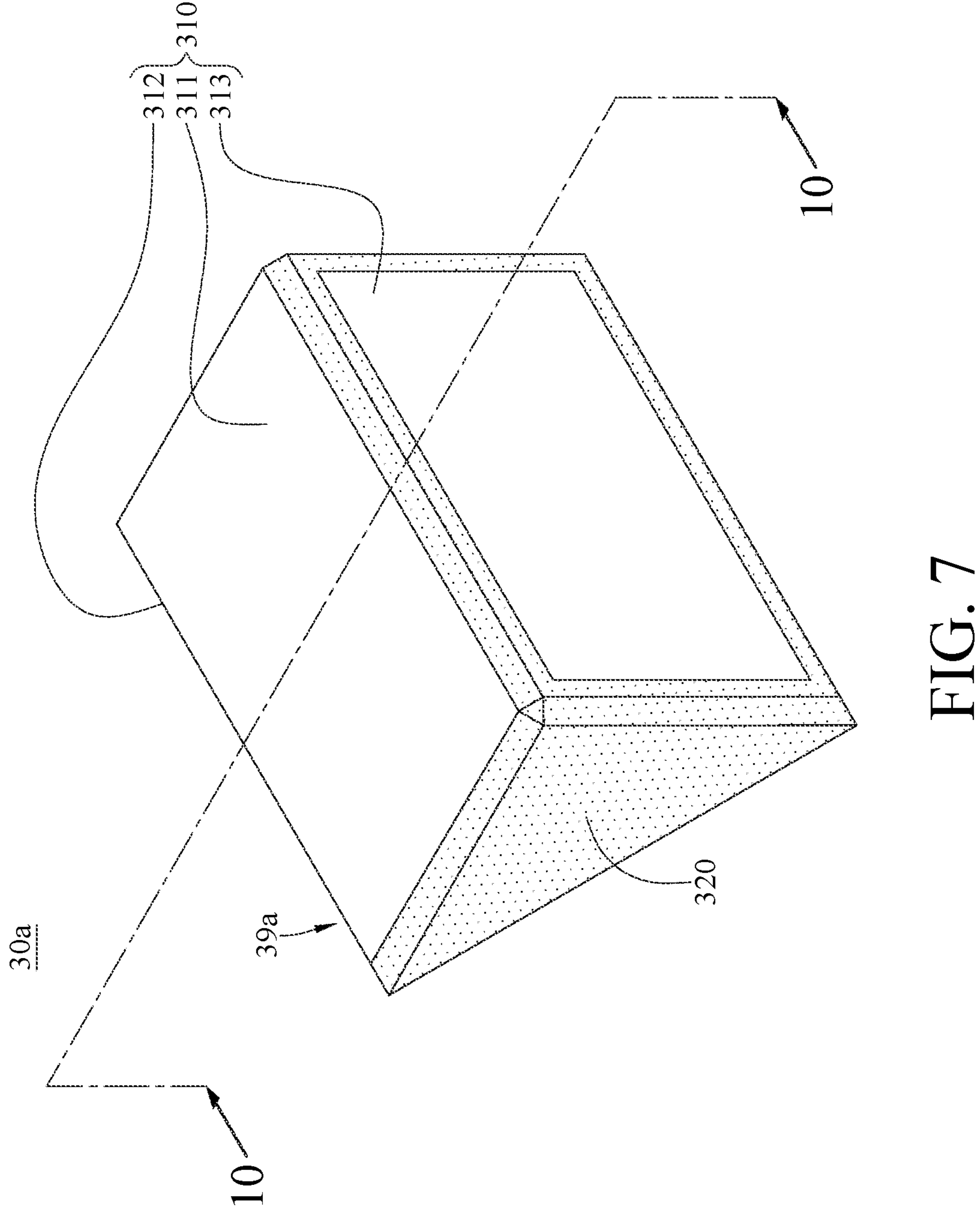
FIG. 7 is a perspective view of an optical path folding element according to the 2nd embodiment of the present disclosure.
Figures 8, 9:
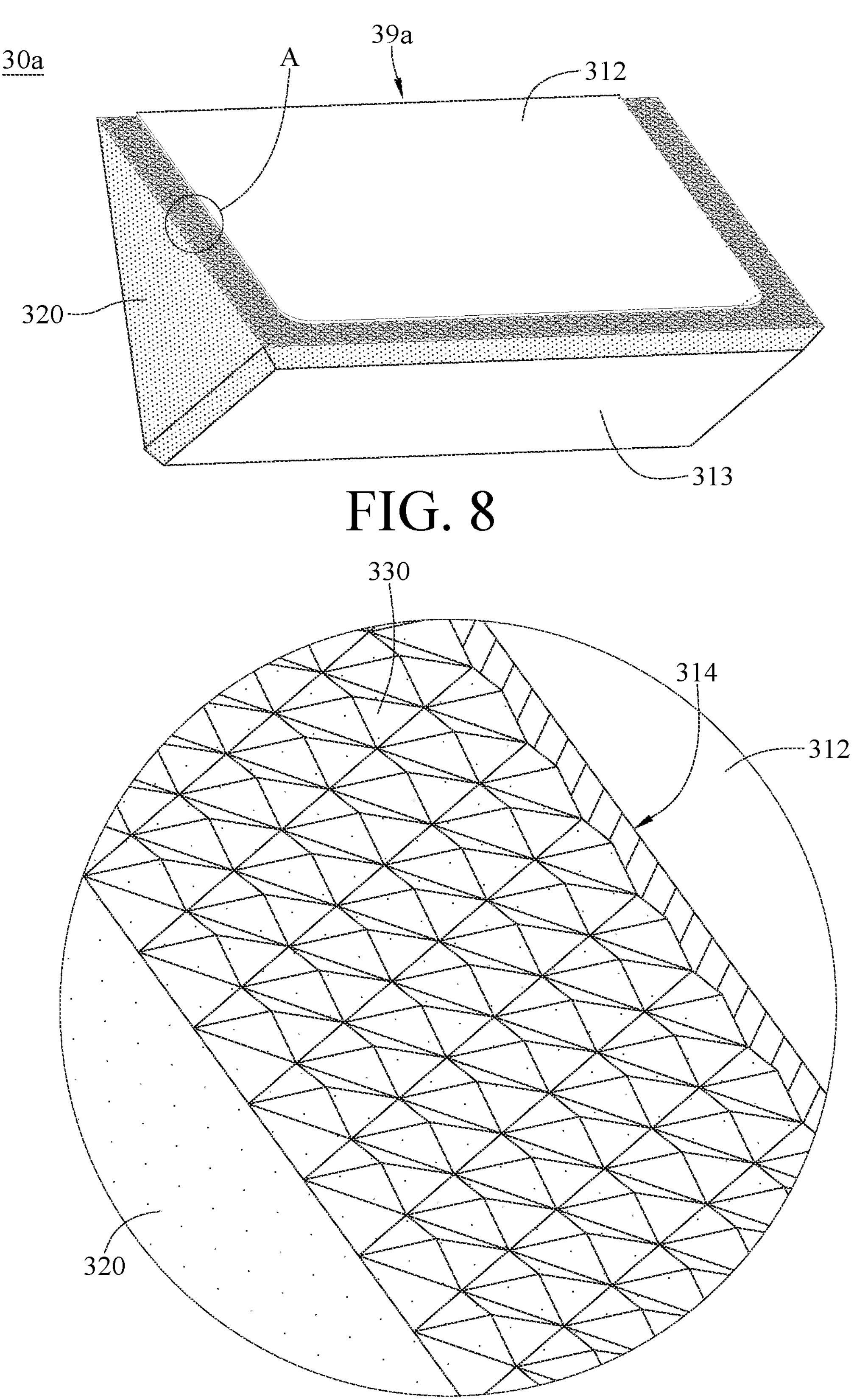
FIG. 8 is another perspective view of the optical path folding element in FIG. 7.
FIG. 9 is an enlarged view of a portion A of the optical path folding element in FIG. 8.
Figure 10:
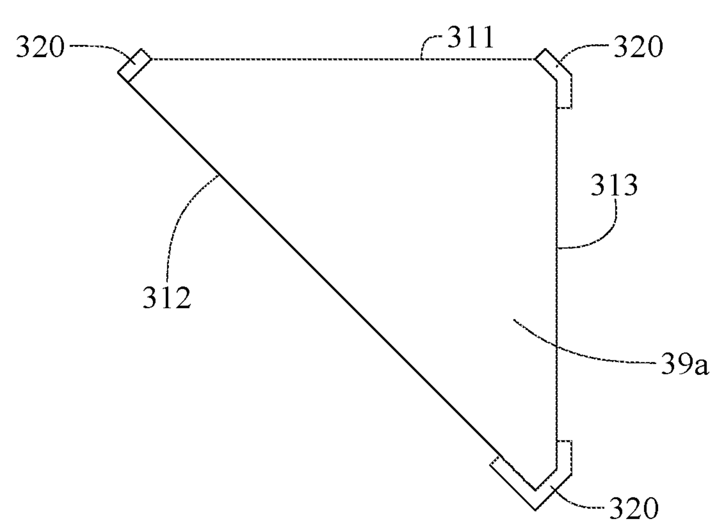
FIG. 10 is a cross-sectional view of the optical path folding element sectioned along line 10-10 in FIG. 7.

Please refer to FIG. 7 through FIG. 10, where FIG. 7 is a perspective view of an optical path folding element according to the 2nd embodiment of the present disclosure, FIG. 8 is another perspective view of the optical path folding element in FIG. 7, FIG. 9 is an enlarged view of a portion A of the optical path folding element in FIG. 8, and FIG. 10 is a cross-sectional view of the optical path folding element sectioned along line 10-10 in FIG. 7. In this embodiment, an optical path folding element **30*a* is applicable to the imaging lens module 1 in FIG. 1. Specifically, the optical path folding element 30***a* can be used to replace the optical path folding element 30 or the second optical path folding element 40 in FIG. 1.

The optical path folding element 30*a* can include a main body 39*a* served as a plastic prism, and the main body 39*a* has an optical surface 310. The optical surface 310 includes an incident surface 311, a reflective surface 312 and an emitting surface 313. The light enters into the optical path folding element 30*a* through the incident surface 311. The reflective surface 312 is configured to reflect the light so as to change a traveling direction thereof. The light exits the optical path folding element 30*a* through the emitting surface 313.

In this embodiment, the optical path folding element 30*a* further includes a light absorption film layer 320 configured to reduce reflectance. The light absorption film layer 320 is disposed adjacent to at least part of the optical surface 310, and the light absorption film layer 320 is in physical contact with the main body 39*a* of the optical path folding element 30*a*. In detail, the light absorption film layer 320 is disposed adjacent to the incident surface 311, the reflective surface 312 and the emitting surface 313 of the optical surface 310, and the light absorption film layer 320 is in physical contact with surfaces of the main body 39*a* other than the optical surface 310.

In this embodiment, the optical path folding element 30*a* further includes a matte structure 330, and the matte structure 330 is disposed adjacent to at least part of the optical surface 310. The matte structure 330 provides an undulating profile on a surface of the optical path folding element 30*a*, and the matte structure 330 is formed in one-piece with the main body 39*a* of the optical path folding element 30*a*. Specifically, the main body 39*a* and the matte structure 330 can be formed as one piece by an injection molding process. In this embodiment, the matte structure 330 includes concave and convex portions arranged at regular intervals, such as multiple quadrangular tapered projections arranged in an array as shown in FIG. 9. The light absorption film layer 320 is disposed on the matte structure 330, and the light absorption film layer 320 as well as the matte structure 330 are disposed adjacent to the reflective surface 312 of the optical surface 310.

In this embodiment, at least part of the optical surface 310 of the optical path folding element 30*a* has a step structure 314 at an edge thereof. The step structure 314 provides a convex shape on the optical surface 310 with respect to a region proximal to the optical surface 310. As shown in FIG. 9, the step structure 314 is located at an edge of the reflective surface 312, and the reflective surface 312 is convex with respect to the matte structure 330 at the proximity thereof.

3rd Embodiment

Figure 11:
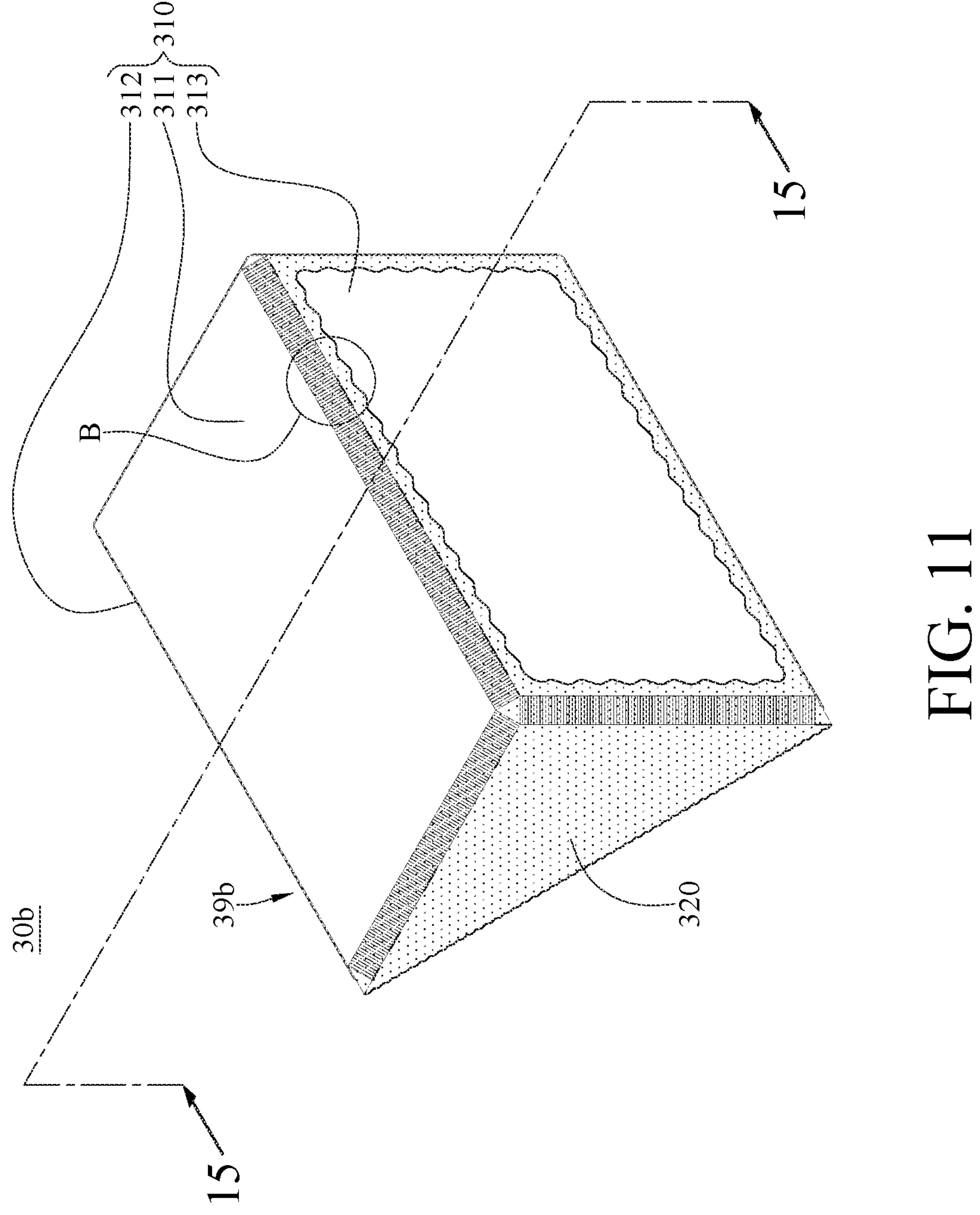
FIG. 11 is a perspective view of an optical path folding element according to the 3rd embodiment of the present disclosure.
Figure 12:
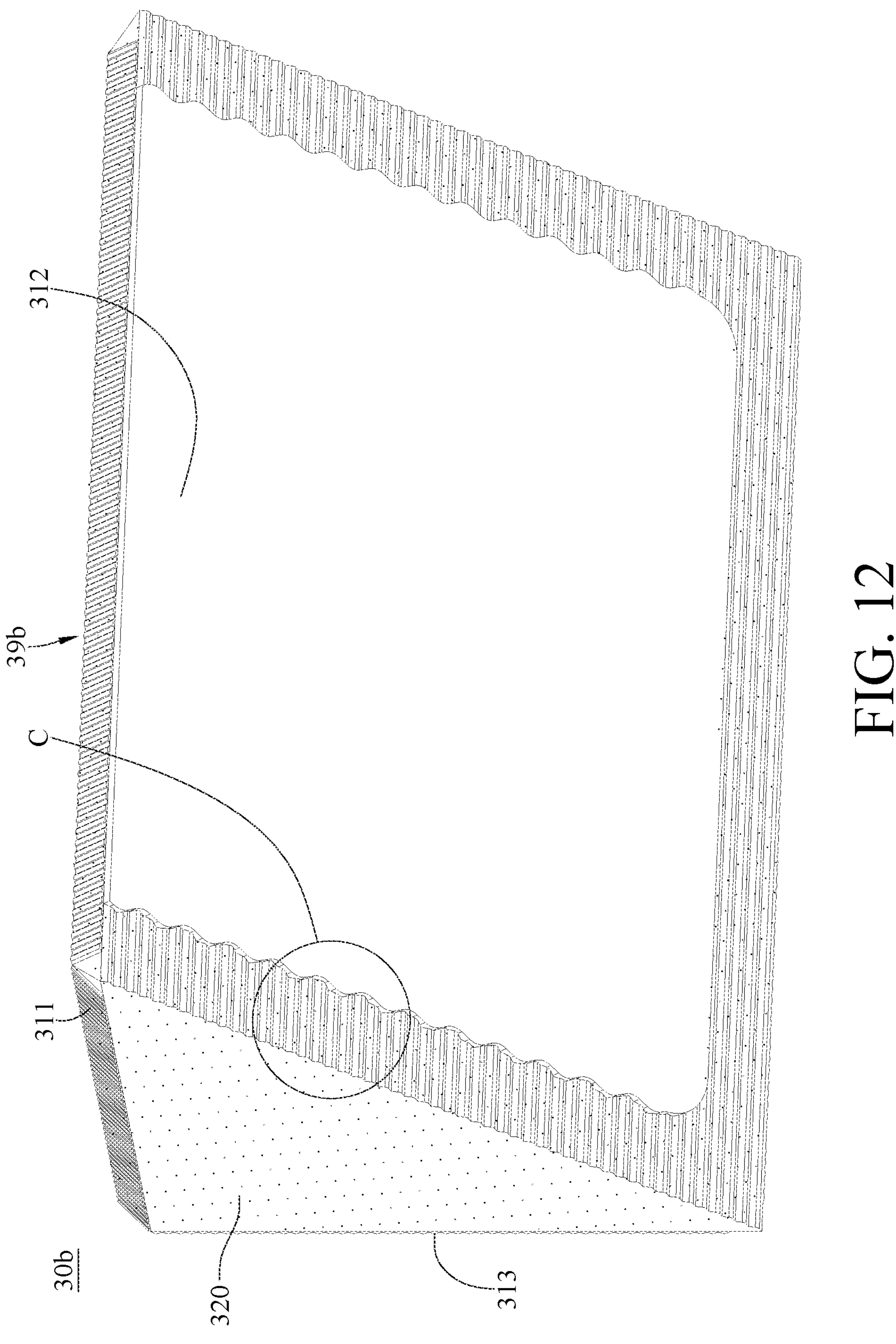
FIG. 12 is another perspective view of the optical path folding element in FIG. 11.
Figure 13:
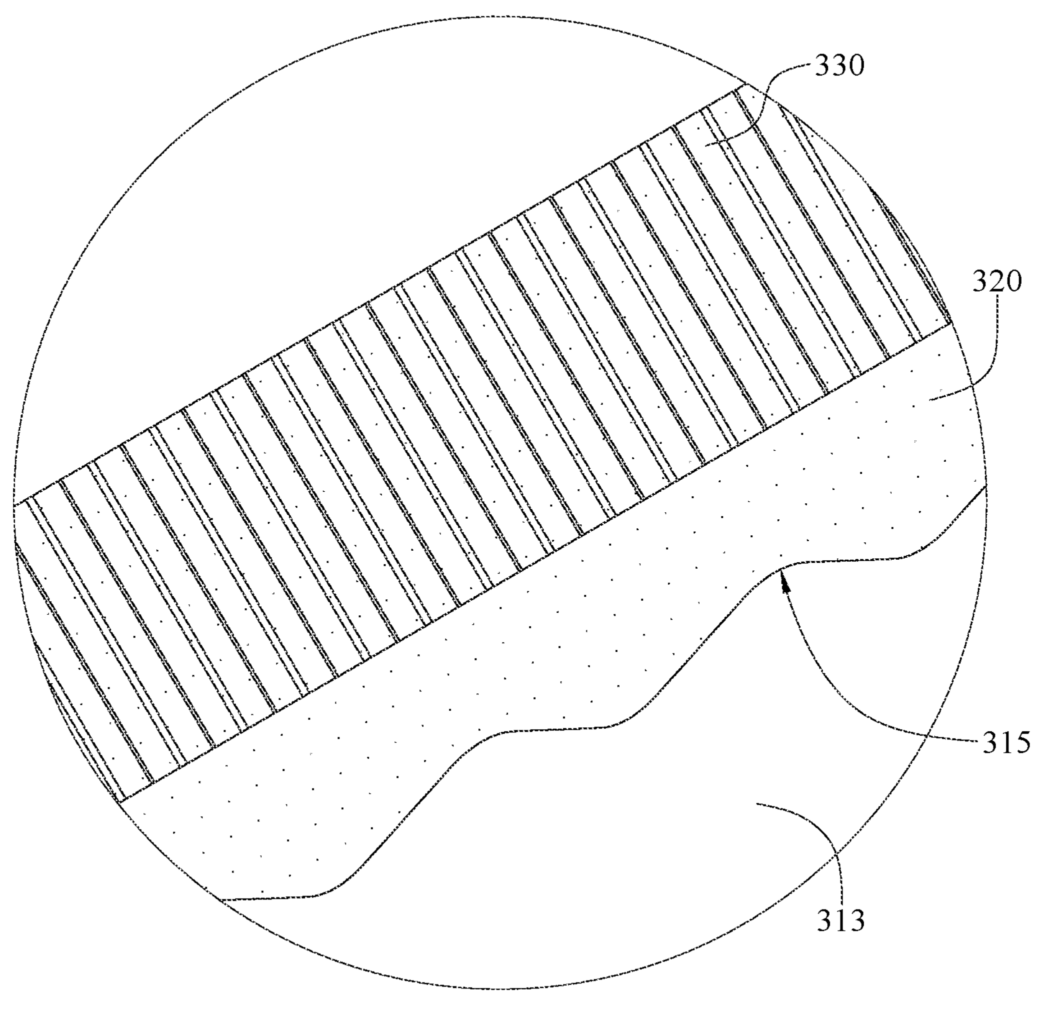
FIG. 13 is an enlarged view of a portion B of the optical path folding element in FIG. 11.
Figure 14:
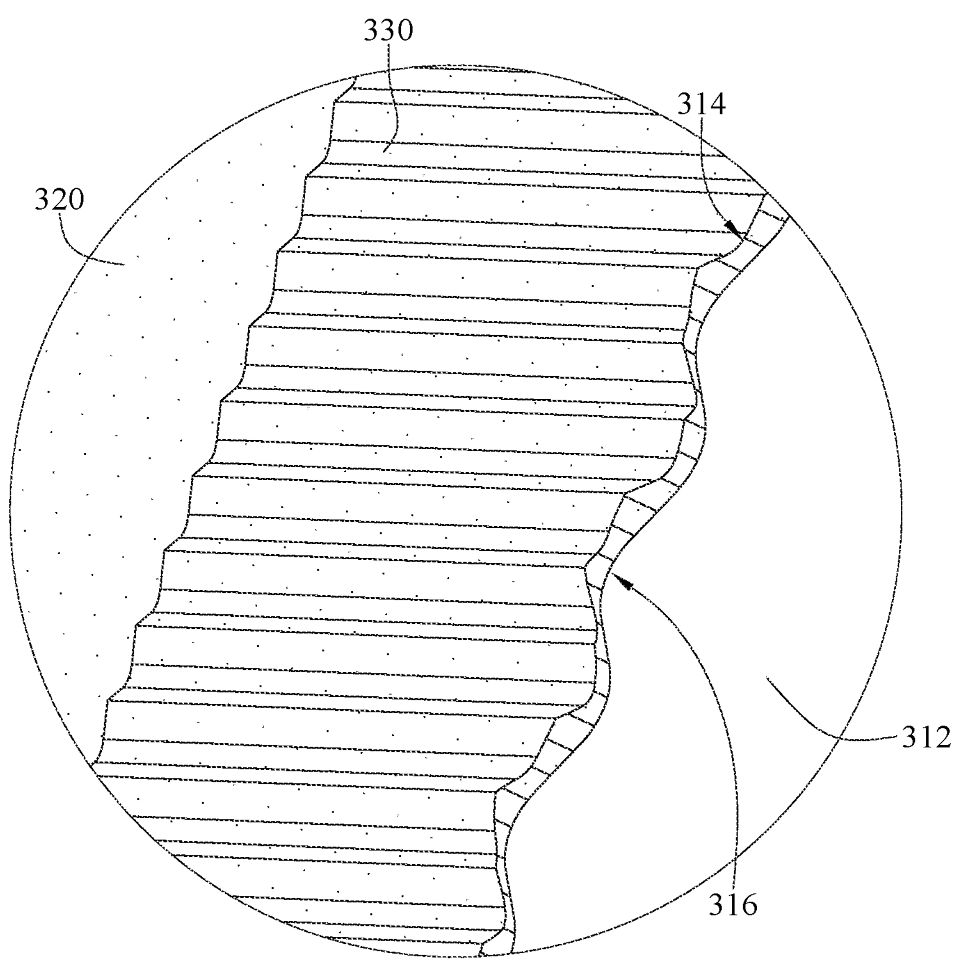
FIG. 14 is an enlarged view of a portion C of the optical path folding element in FIG. 12.
Figure 15:
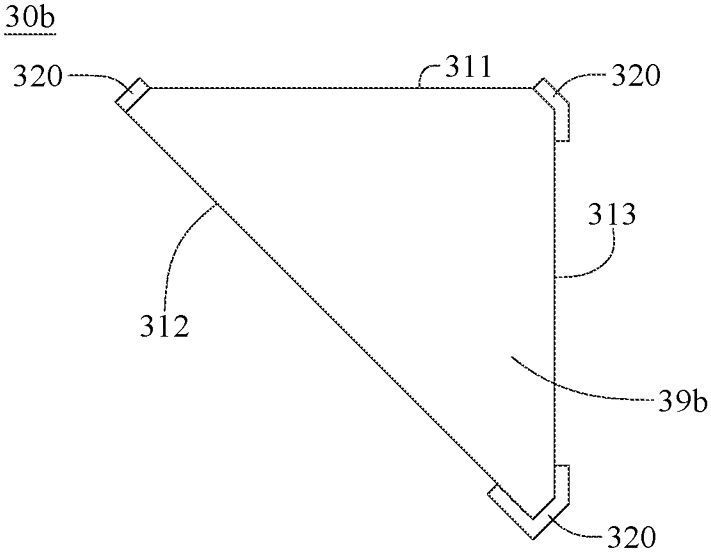
FIG. 15 is a cross-sectional view of the optical path folding element sectioned along line 15-15 in FIG. 11.

Please refer to FIG. 11 through FIG. 15, where FIG. 11 is a perspective view of an optical path folding element according to the 3rd embodiment of the present disclosure, FIG. 12 is another perspective view of the optical path folding element in FIG. 11, FIG. 13 is an enlarged view of a portion B of the optical path folding element in FIG. 11, FIG. 14 is an enlarged view of a portion C of the optical path folding element in FIG. 12, and FIG. 15 is a cross-sectional view of the optical path folding element sectioned along line 15-15 in FIG. 11.

In this embodiment, an optical path folding element 30*b* is applicable to the imaging lens module 1 in FIG. 1. Specifically, the optical path folding element 30*b* can be used to replace the optical path folding element 30 or the second optical path folding element 40 in FIG. 1.

The optical path folding element 30*b* can include a main body 39*b* served as a plastic prism, and the main body 39*b* has an optical surface 310. The optical surface 310 includes an incident surface 311, a reflective surface 312 and an emitting surface 313. The light enters into the optical path folding element 30*b* through the incident surface 311. The reflective surface 312 is configured to reflect the light so as to change a traveling direction thereof. The light exits the optical path folding element 30*b* through the emitting surface 313.

In this embodiment, the optical path folding element 30*b* further includes a light absorption film layer 320 configured to reduce reflectance. The light absorption film layer 320 is disposed adjacent to at least part of the optical surface 310, and the light absorption film layer 320 is in physical contact with the main body 39*b* of the optical path folding element 30*b*. In detail, the light absorption film layer 320 is disposed adjacent to the incident surface 311, the reflective surface 312 and the emitting surface 313 of the optical surface 310, and the light absorption film layer 320 is in physical contact with surfaces of the main body 39*b* other than the optical surface 310.

In this embodiment, the optical path folding element 30*b* further includes a matte structure 330, and the matte structure 330 is disposed adjacent to at least part of the optical surface 310. The matte structure 330 provides an undulating profile on a surface of the optical path folding element 30*b*, and the matte structure 330 is formed in one-piece with the main body 39*b* of the optical path folding element 30*b*. In this embodiment, the matte structure 330 includes concave and convex portions arranged at regular intervals, such as multiple striped depressions arranged linearly at regular intervals as shown in FIG. 11. The light absorption film layer 320 is disposed on the matte structure 330, and the light absorption film layer 320 as well as the matte structure 330 are disposed adjacent to the reflective surface 312 and the emitting surface 313 of the optical surface 310.

In this embodiment, at least part of the optical surface 310 of the optical path folding element 30*b* has a step structure 314 at an edge thereof. The step structure 314 provides a convex shape on the optical surface 310 with respect to a region proximal to the optical surface 310. As shown in FIG. 14, the step structure 314 is located at an edge of the reflective surface 312, and the reflective surface 312 is convex with respect to the matte structure 330 at the proximity thereof.

In this embodiment, an edge profile of the optical surface 310 of the optical path folding element 30*b* has a plurality of protrusions 315, 316. The protrusions 315, 316 provide an extension of part of the edge profile of the optical surface 310 in a direction away from a center of the optical surface 310. As shown in FIG. 13, an edge profile of the emitting surface 313 has the protrusions 315. The protrusions 315 provide an extension of part of the edge profile of the emitting surface 313 in a direction away from a center of the emitting surface 313. As shown in FIG. 14, an edge profile of the reflective surface 312 has the protrusions 316. The protrusions 316 provide an extension of part of the edge profile of the reflective surface 312 in a direction away from a center of the reflective surface 312. The protrusions 315, 316 provide a wavy shape on the edge profiles of the emitting surface 313 and the reflective surface 312, respectively.

4th Embodiment

Figure 16:
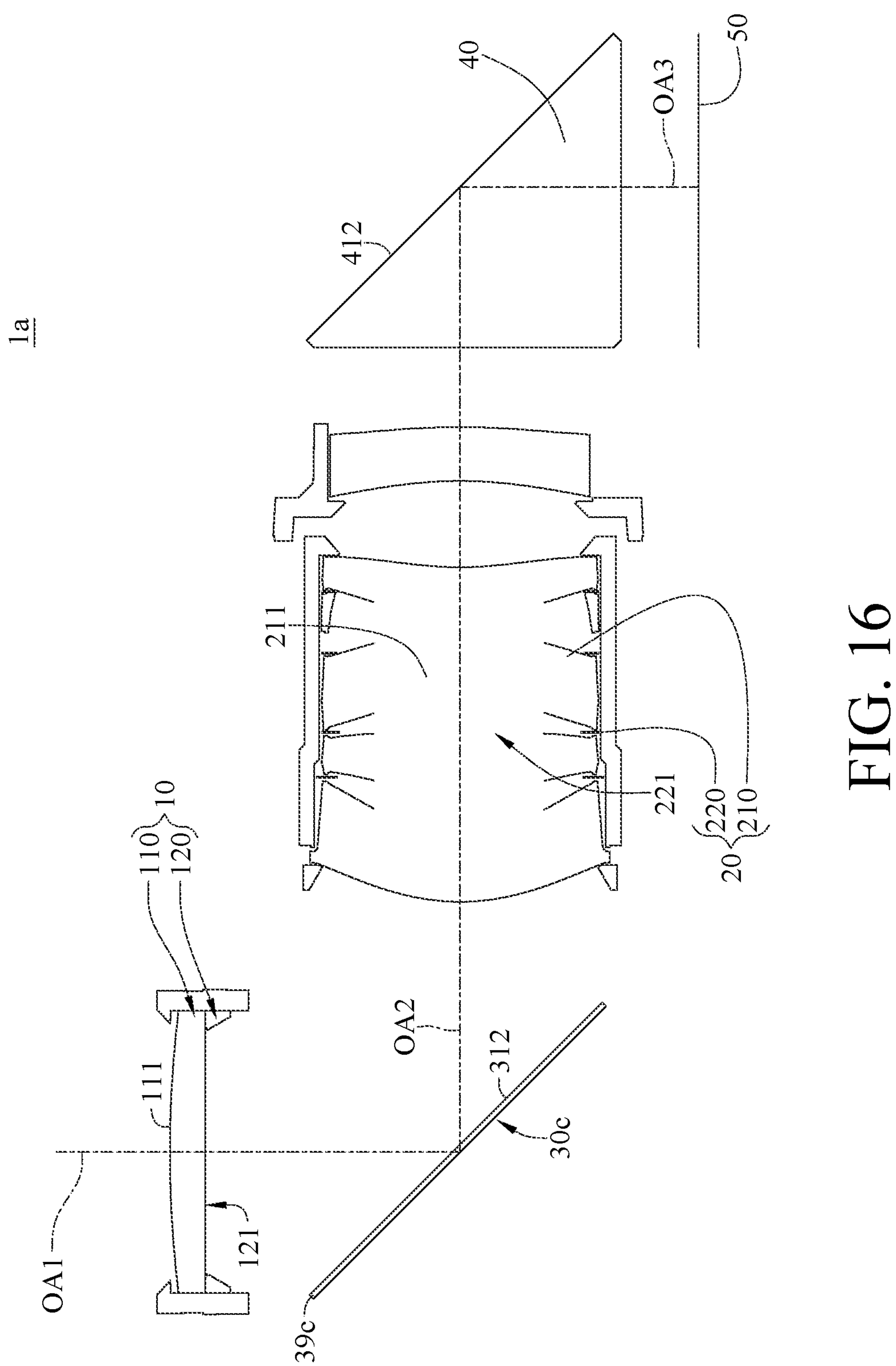
FIG. 16 is a perspective view of an imaging lens module according to the 4th embodiment of the present disclosure.
Figure 17:
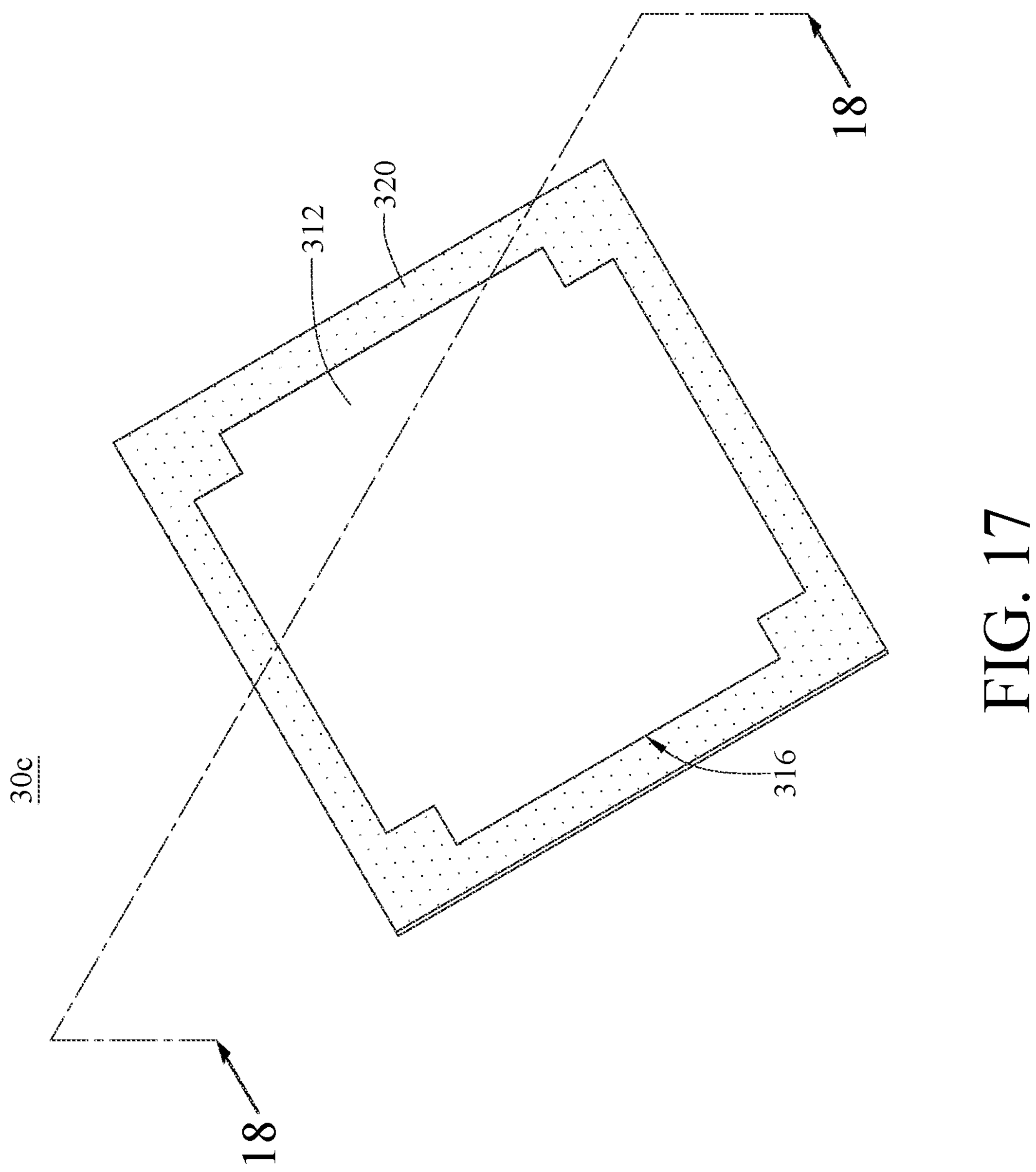
FIG. 17 is a perspective view of an optical path folding element of the imaging lens module in FIG. 16.
Figure 18:
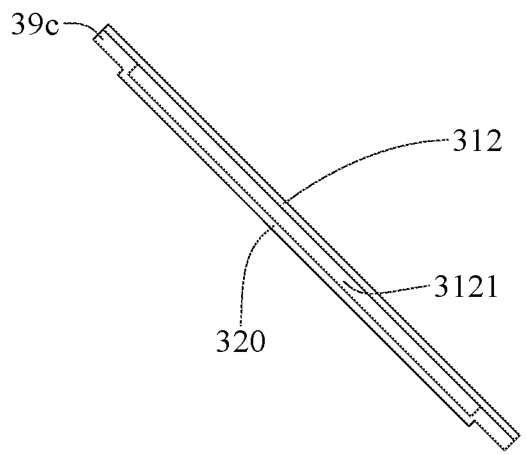
FIG. 18 is a cross-sectional view of the optical path folding element sectioned along line 18-18 FIG. 17.

Please refer to FIG. 16 through FIG. 18, where FIG. 16 is a perspective view of an imaging lens module according to the 4th embodiment of the present disclosure, FIG. 17 is a perspective view of an optical path folding element of the imaging lens module in FIG. 16, and FIG. 18 is a cross-sectional view of the optical path folding element sectioned along line 18-18 FIG. 17.

In this embodiment, an imaging lens module 1*a* includes, in order from an object side to an image side along an optical path, a first lens assembly 10, an optical path folding element 30*c*, a second lens assembly 20, a second optical path folding element 40 and an image surface 50.

The first lens assembly 10 is disposed at an object side of the optical path folding element 30*c*. The first lens assembly 10 includes a first lens element 110 and a first light blocking element 120. FIG. 16 shows single first lens element 110, but the present is not limited to the number of the first lens element 110. The first lens element 110 includes a first optically effective portion 111, and the light can pass through the first optically effective portion 111. The first light blocking element 120 has a first light passing aperture 121. The first light passing aperture 121 is disposed corresponding to the optical path folding element 30*c*, and the light can pass through the first light passing aperture 121.

The second lens assembly 20 is disposed at an image side of the optical path folding element 30*c*. The second lens assembly 20 includes a second lens element 210 and a second light blocking element 220. FIG. 16 shows multiple second lens elements 210, but the present is not limited to the number of the second lens element 210. Each of the second lens elements 210 includes a second optically effective portion 211, and the light can pass through the second optically effective portion 211. The second light blocking element 220 has a second light passing aperture 221. The second light passing aperture 221 is disposed corresponding to the optical path folding element 30*c*, and the light can pass through the second light passing aperture 221. The second lens assembly 20 is movable with respect to the image surface 50 so as to provide optical image stabilization or auto focusing functionality for the imaging lens module 1*a*.

The optical path folding element 30*c* is disposed between the first lens assembly 10 and the second lens assembly 20. More specifically, the optical path folding element 30*c* is disposed at an image side of the first lens assembly 10 and an object side of the second lens assembly 20. The optical path folding element 30*c* can include a main body 39*c* served as a planar reflective mirror. The main body 39*c* has the reflective surface 312 but no incident surface 311 and emitting surface 313. In other words, the optical surface of the optical path folding element 30*c* is a single surface (reflective surface 312). The reflective surface 312 is configured to reflect the light so as to change a traveling direction thereof. Moreover, the reflective surface 312 is coated with a reflective film 3121 for light reflection, and a primary element of the reflective film 3121 can include aluminum.

In this embodiment, the optical path folding element 30*c* further includes a light absorption film layer 320 configured to reduce reflectance. The light absorption film layer 320 is disposed adjacent to the reflective surface 312, and the light absorption film layer 320 is in physical contact with the main body 39*c* of the optical path folding element 30*c*.

In this embodiment, an edge profile of the reflective surface 312 of the optical path folding element 30*c* has a plurality of protrusions 316. The protrusions 316 provide an extension of part of the edge profile of the reflective surface 312 in a direction away from a center of the reflective surface 312.

The second optical path folding element 40 is disposed at an image side of the second lens assembly 20, and is configured to reflect the light toward the image surface 50 so as to change the traveling direction thereof. As shown in FIG. 16, the optical path passes along a first optical axis OA1 through the first lens assembly 10 and the reflective surface 312 of the optical path folding element 30*c*. The optical path is deflected off the reflective surface 312 and then passes along a second optical axis OA2. The optical path passes along the second optical axis OA2 through the second lens assembly 20 to thereby reach a reflective surface 412 of the second optical path folding element 40. The optical path is deflected off the reflective surface 412 and then passes along a third optical axis OA3. The optical path exits the second optical path folding element 40 along the third optical axis OA3 and then reaches the image surface 50.

5th Embodiment

Figure 19:
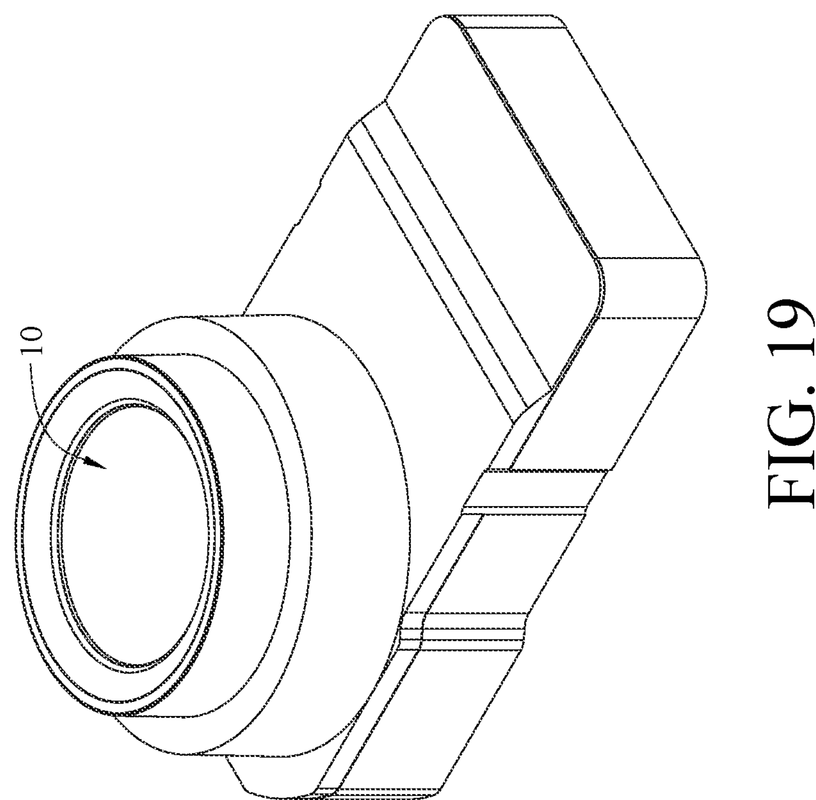
FIG. 19 is a perspective view of an imaging lens module according to the 5th embodiment of the present disclosure.
Figure 20:
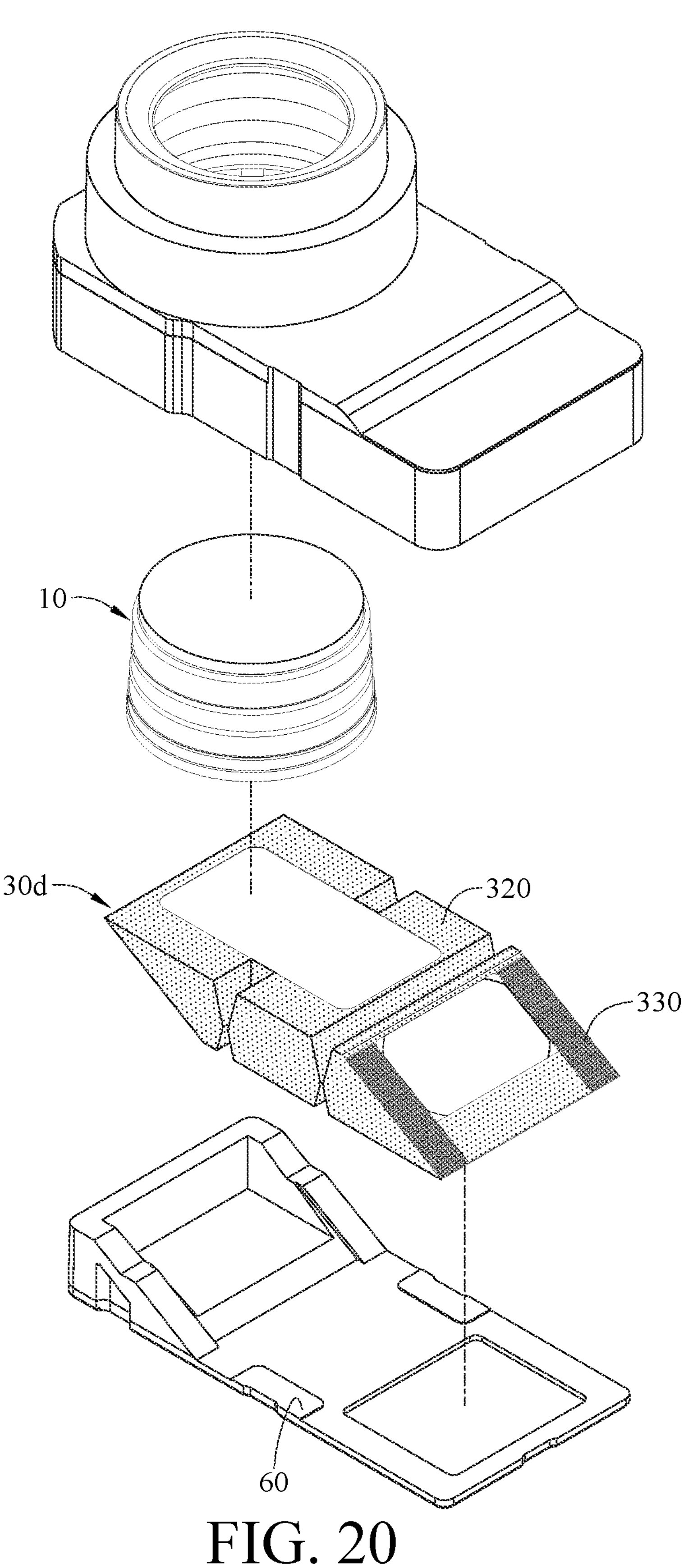
FIG. 20 is an exploded view of the imaging lens module in FIG. 19.
Figure 21:
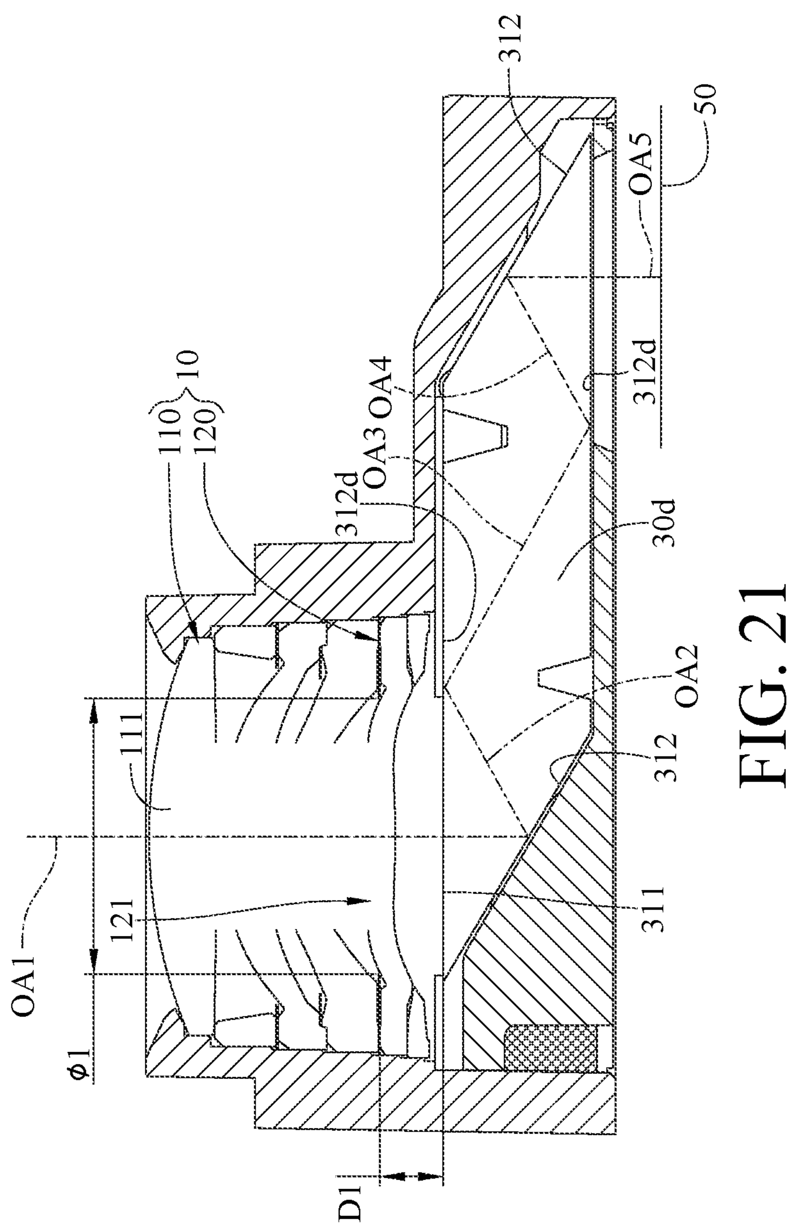
FIG. 21 is a cross-sectional view of the imaging lens module in FIG. 19.
Figure 22:
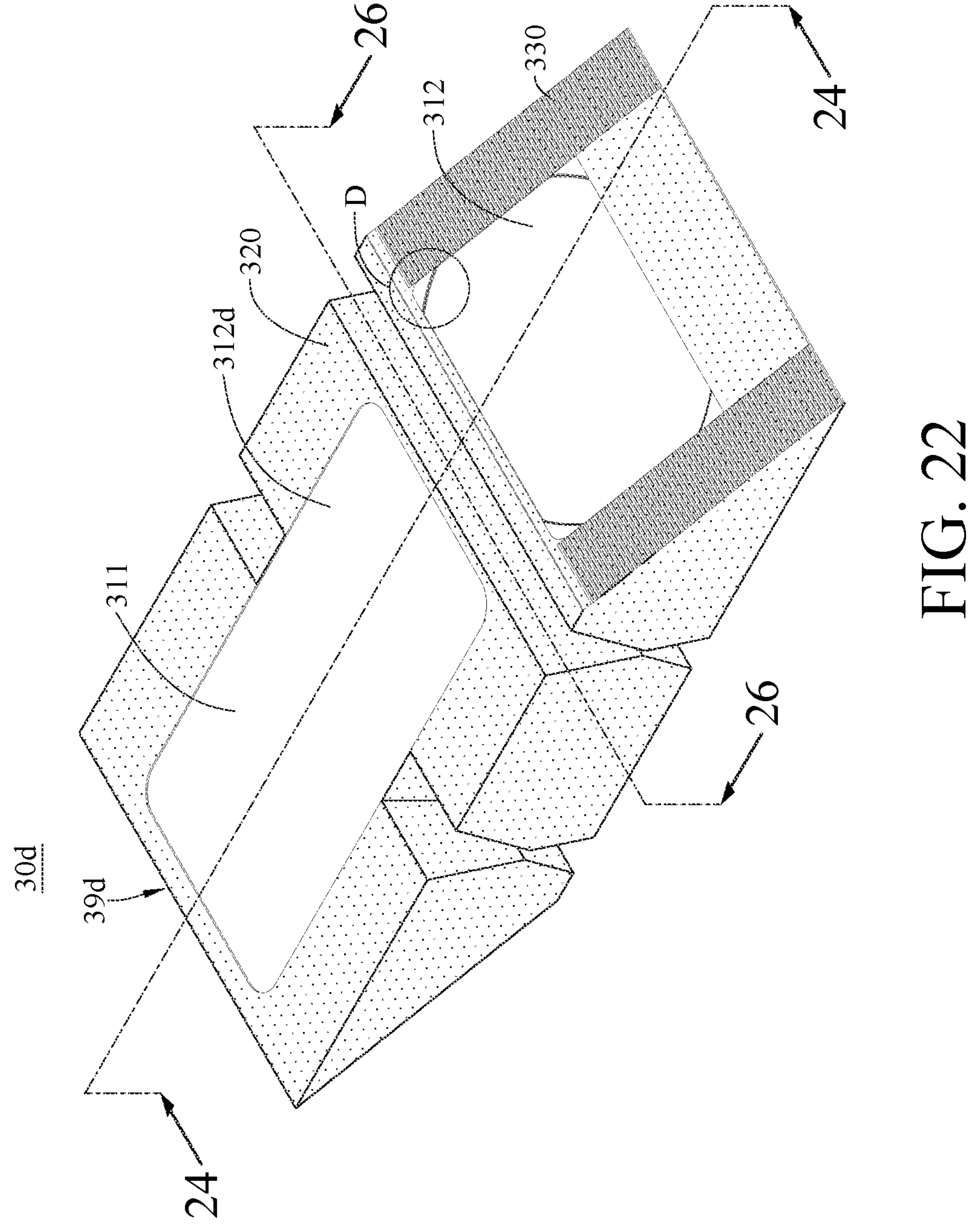
FIG. 22 is a perspective view of an optical path folding element of the imaging lens module in FIG. 19.
Figure 23:
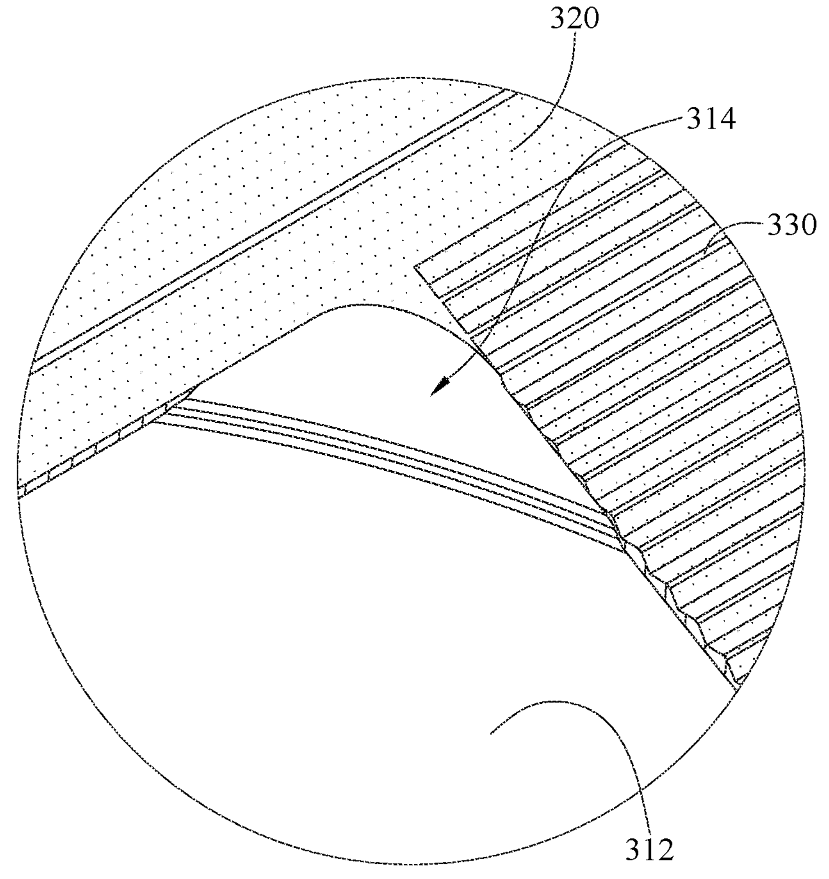
FIG. 23 is an enlarged view of a portion D of the optical path folding element in FIG. 22.
Figure 24:
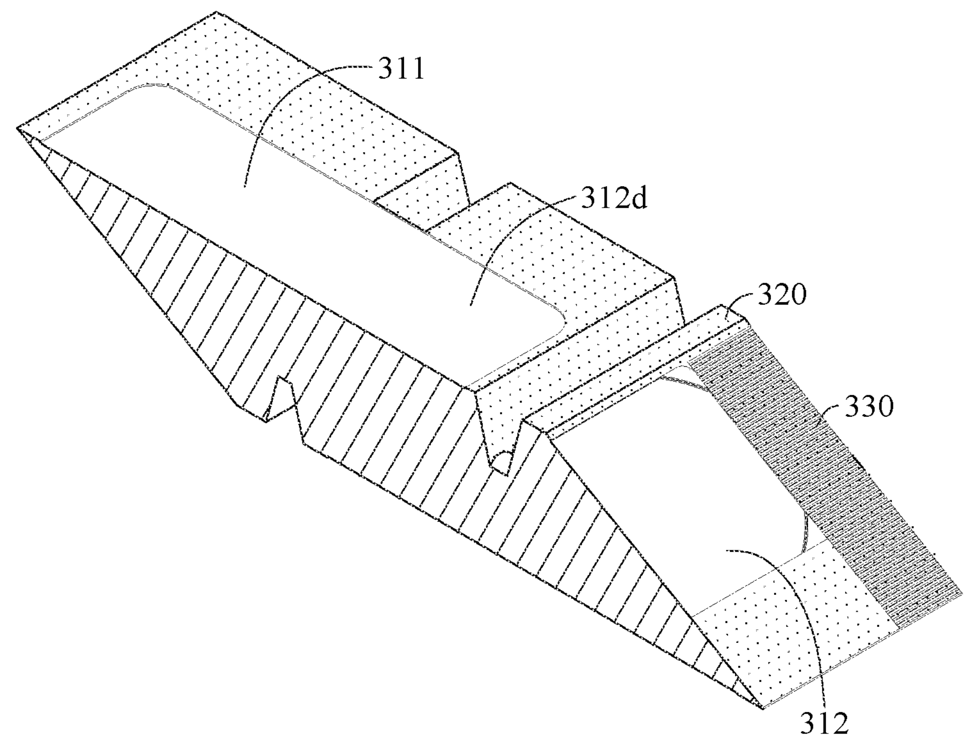
FIG. 24 and FIG. 25 are cross-sectional views of the optical path folding element sectioned along line 24-24 in FIG. 22.
Figure 25:
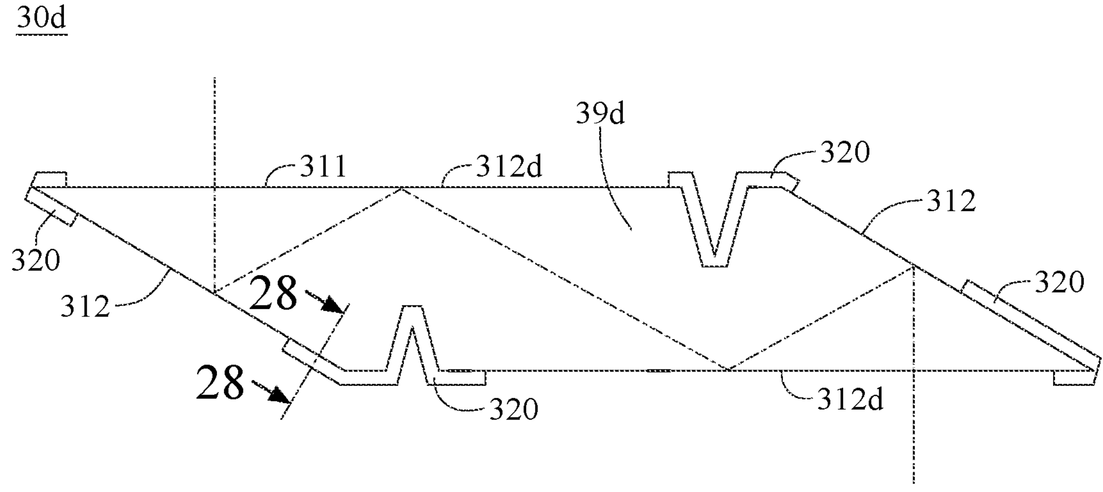
Figure 26:
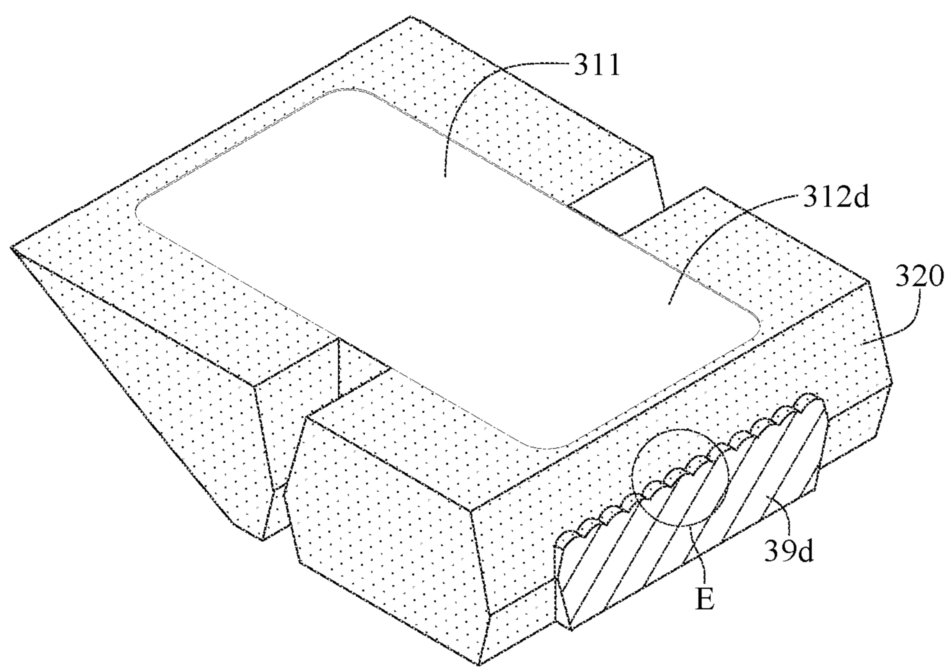
FIG. 26 is a cross-sectional view of the optical path folding element sectioned along line 26-26 in FIG. 22.
Figure 27:
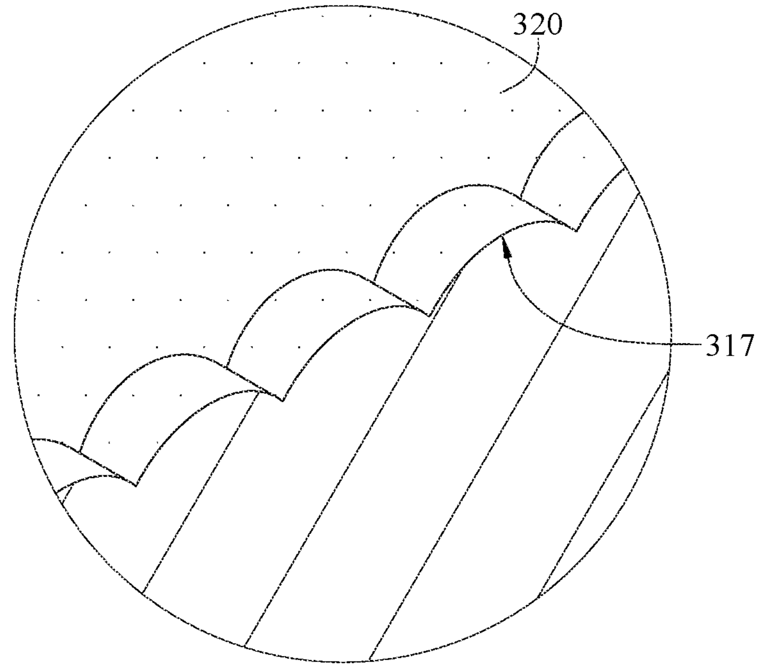
FIG. 27 is an enlarged view of a portion E of the optical path folding element in FIG. 26.
Figure 28:
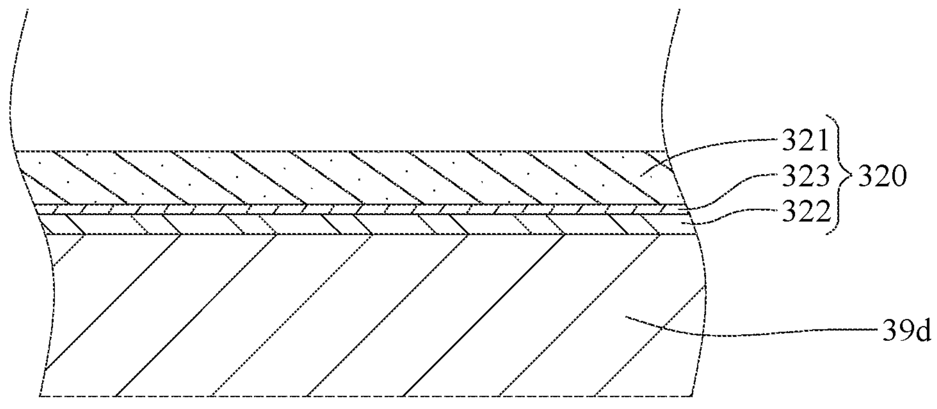
FIG. 28 is a cross-sectional view of the optical path folding element sectioned along line 28-28 in FIG. 25.

Please refer to FIG. 19 through FIG. 28, where FIG. 19 is a perspective view of an imaging lens module according to the 5th embodiment of the present disclosure, FIG. 20 is an exploded view of the imaging lens module in FIG. 19, FIG. 21 is a cross-sectional view of the imaging lens module in FIG. 19, FIG. 22 is a perspective view of an optical path folding element of the imaging lens module in FIG. 19, FIG. 23 is an enlarged view of a portion D of the optical path folding element in FIG. 22, FIG. 24 and FIG. 25 are cross-sectional views of the optical path folding element sectioned along line 24-24 in FIG. 22, FIG. 26 is a cross-sectional view of the optical path folding element sectioned along line 26-26 in FIG. 22, FIG. 27 is an enlarged view of a portion E of the optical path folding element in FIG. 26, and FIG. 28 is a cross-sectional view of the optical path folding element sectioned along line 28-28 in FIG. 25.

In this embodiment, an imaging lens module 2 includes, in order from an object side to an image side along an optical path, a first lens assembly 10, an optical path folding element 30*d*, an image surface 50 and a carrier 60. The first lens assembly 10 and the optical path folding element 30*d* are mounted on the carrier 60.

The first lens assembly 10 is disposed at an object side of the optical path folding element 30*d*. The first lens assembly 10 includes a first lens element 110 and a first light blocking element 120. FIG. 21 shows multiple first lens elements 110, but the present is not limited to the number of the first lens element 110. Each of the first lens elements 110 includes a first optically effective portion 111, and the light can pass through the first optically effective portion 111. The first light blocking element 120 has a first light passing aperture 121. The first light passing aperture 121 is disposed corresponding to the optical path folding element 30*d*, and the light can pass through the first light passing aperture 121. The first light passing aperture 121 is a smallest light passing aperture in the first lens assembly 10.

The optical path folding element 30*d* is disposed between the first lens assembly 10 and the image surface 50. More specifically, the optical path folding element 30*d* is disposed at an image side of the first lens assembly 10. The optical path folding element 30*d* can include a main body 39*d* served as a plastic prism, and the main body 39*d* has an optical surface 310. The optical surface 310 includes an incident surface 311, a reflective surface 312, a reflective surface 312*d* and an emitting surface 313. The light enters into the optical path folding element 30*d* through the incident surface 311. The reflective surfaces 312, 312*d* are configured to reflect the light so as to change a traveling direction thereof. The light exits the optical path folding element 30*d* through the emitting surface 313. In this embodiment, the reflective surface 312 is coated with an anti-reflective film for light reflection, and a primary element of the anti-reflective film can include aluminum. The reflective surface 312*d* changes the traveling direction of light by total internal reflection.

In this embodiment, the optical path folding element 30*d* further includes a light absorption film layer 320 configured to reduce reflectance. The light absorption film layer 320 is disposed adjacent to at least part of the optical surface 310, and the light absorption film layer 320 is in physical contact with the main body 39*d* of the optical path folding element 30*d*. In detail, the light absorption film layer 320 is disposed adjacent to the incident surface 311, the reflective surface 312, the reflective surface 312*d* and the emitting surface 313 of the optical surface 310, and the light absorption film layer 320 is in physical contact with surfaces of the main body 39*d* other than the optical surface 310.

In this embodiment, the light absorption film layer 320 includes a light absorbing film 321. The light absorbing film 321 includes a metal layer, and a primary element of the metal layer is Cr. The light absorbing film 321 can be dark in appearance and can absorb visible light.

In this embodiment, the light absorption film layer 320 further includes a first anti-reflective film 322. As shown in FIG. 28, the first anti-reflective film 322 is close to the main body 39*d* of the optical path folding element 30*d* with respect to the light absorbing film 321. The first anti-reflective film 322 includes a first high refractive layer and a first low refractive layer, and the first high refractive layer is alternately laminated with the first low refractive layer. A primary element of the first high refractive layer can be $TiO_2$, and a primary element of the first low refractive layer can be $SiO_2$.

In this embodiment, the light absorption film layer 320 further includes an interlayer 323. As shown in FIG. 28, the interlayer 323 is disposed between the first anti-reflective film 322 and the light absorbing film 321. The interlayer 323 has the same primary element as the first high refractive layer or the first low refractive layer.

In this embodiment, the optical path folding element 30*d* further includes a matte structure 330, and the matte structure 330 is disposed adjacent to at least part of the optical surface 310. The matte structure 330 provides an undulating profile on a surface of the optical path folding element 30*d*, and the matte structure 330 is formed in one-piece with the main body 39*d* of the optical path folding element 30*d*. In this embodiment, the matte structure 330 includes concave and convex portions arranged at regular intervals, such as multiple striped depressions arranged linearly at regular intervals. The light absorption film layer 320 is disposed on the matte structure 330, and the light absorption film layer 320 as well as the matte structure 330 are disposed adjacent to the reflective surface 312 of the optical surface 310.

In this embodiment, at least part of the optical surface 310 of the optical path folding element 30*d* has a step structure 314 at an edge thereof. The step structure 314 provides a concave shape on the optical surface 310 with respect to a region proximal to the optical surface 310. As shown in FIG. 23, the step structure 314 is located at an edge of the reflective surface 312, and the reflective surface 312 is concave with respect to the matte structure 330 at the proximity thereof.

In this embodiment, a light passing portion of the main body 39*d* of the optical path folding element 30*d* has a plurality of protrusions 317. As shown in FIG. 27, the protrusions 317 provide a wavy shape on an edge profile of partial cross section of the main body 39*d* of the optical path folding element 30*d*, and thus it is favorable for reducing stray light.

As shown in FIG. 21, the optical path passes along a first optical axis OA1 through the first lens assembly 10 and the incident surface 311 of the optical path folding element 30*d* to thereby reach the reflective surface 312. The optical path is deflected off the reflective surface 312 and then passes along a second optical axis OA2. The optical path passes along the second optical axis OA2 to thereby reach the reflective surface 312*d*. The optical path is deflected off the reflective surface 312*d* and then passes along a third optical axis OA3. The optical path passes along the third optical axis OA3 to thereby reach another reflective surface 312*d*. The optical path is deflected off the another reflective surface 312*d* and then passes along a fourth optical axis OA4. The optical path passes along the fourth optical axis OA4 to thereby reach another reflective surface 312. The optical path is deflected off the another reflective surface 312 and then passes along a fifth optical axis OA5. The optical path exits the optical path folding element 30*d* along the fifth optical axis OA5 and then reaches the image surface 50. In short, the light entering into the optical path folding element 30*d* is reflected four times, and the total internal reflection occurs at the reflective surfaces 312*d*.

In the first lens assembly 10 of this embodiment, when a minimum size of the first light passing aperture 121 is $\varphi 1$, and a shortest vertical distance between the first light passing aperture 121 and the optical path folding element 30*d* is D1, the following condition is satisfied: $\varphi 1=4.85$ mm; $D1=1.11$ mm; and $\varphi 1/(D1+1)=2.30$.

6th Embodiment

Figure 29:
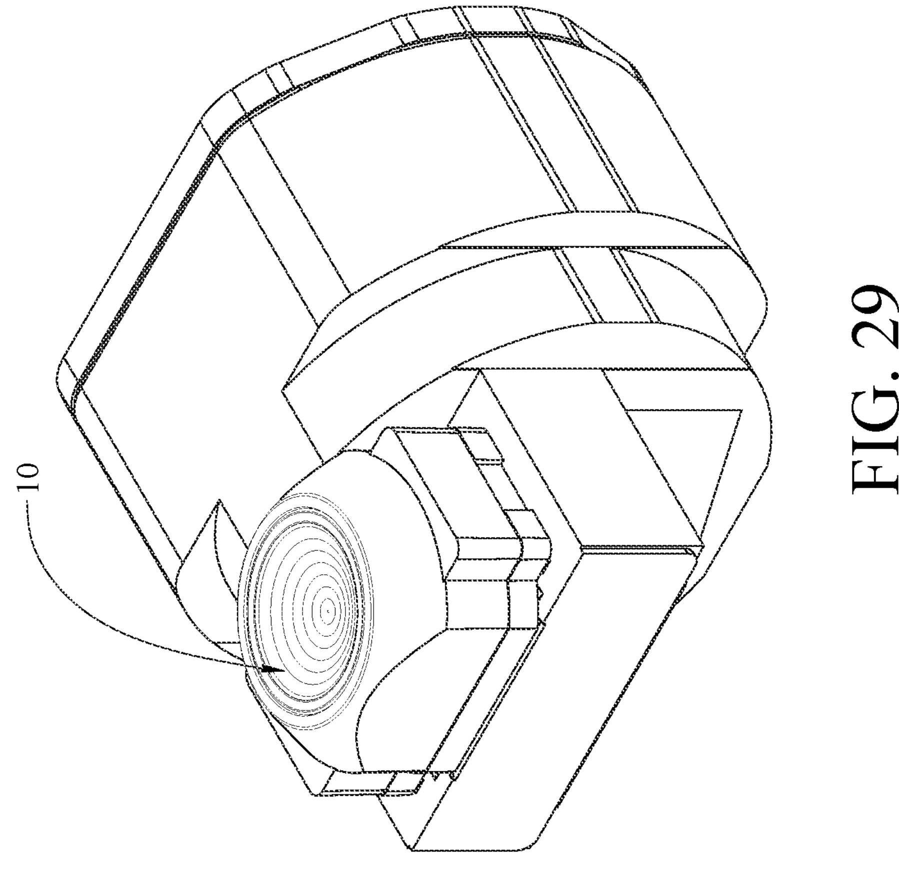
FIG. 29 is a perspective view of an imaging lens module according to the 6th embodiment of the present disclosure.
Figure 30:
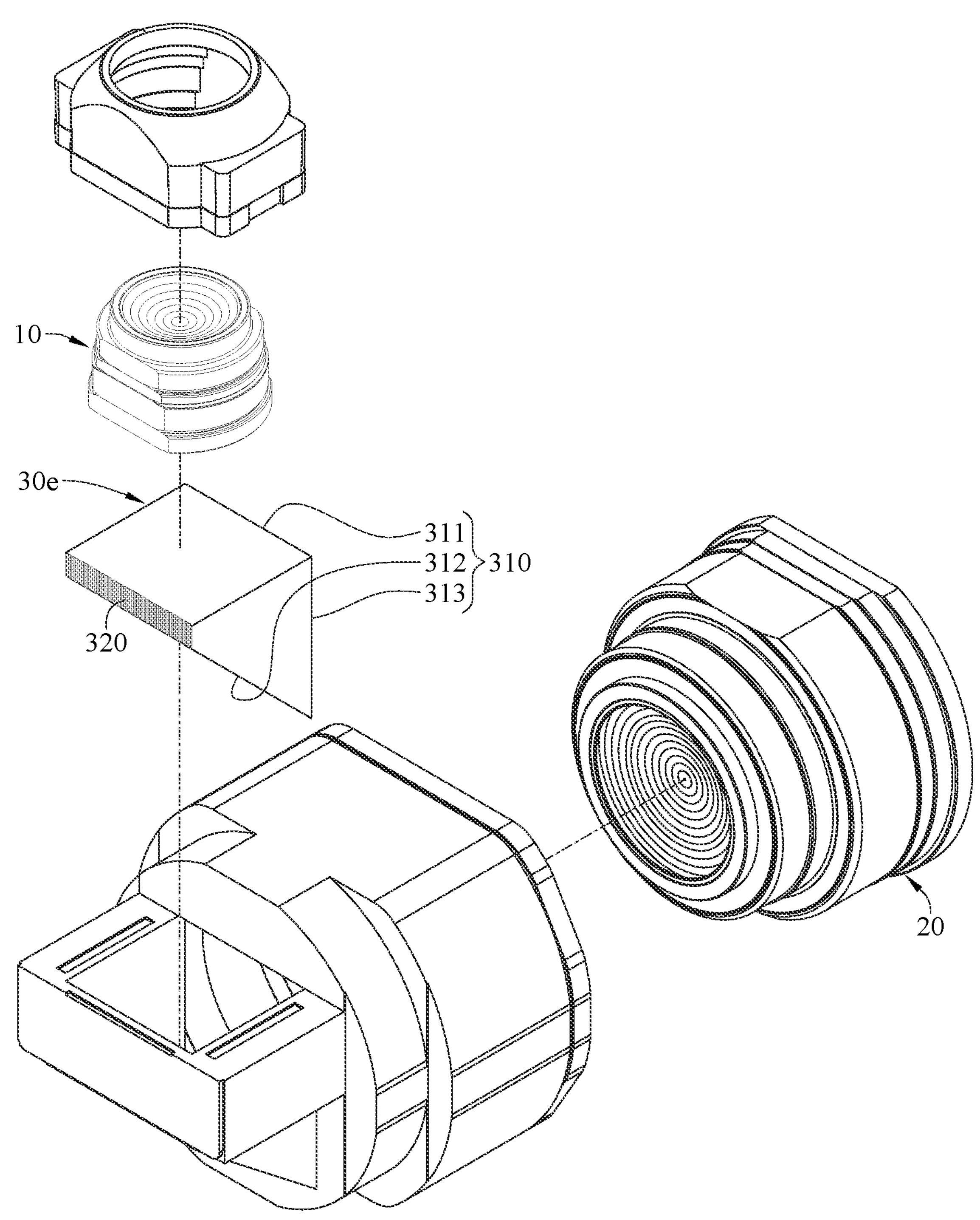
FIG. 30 is an exploded view of the imaging lens module in FIG. 29.
Figure 31:
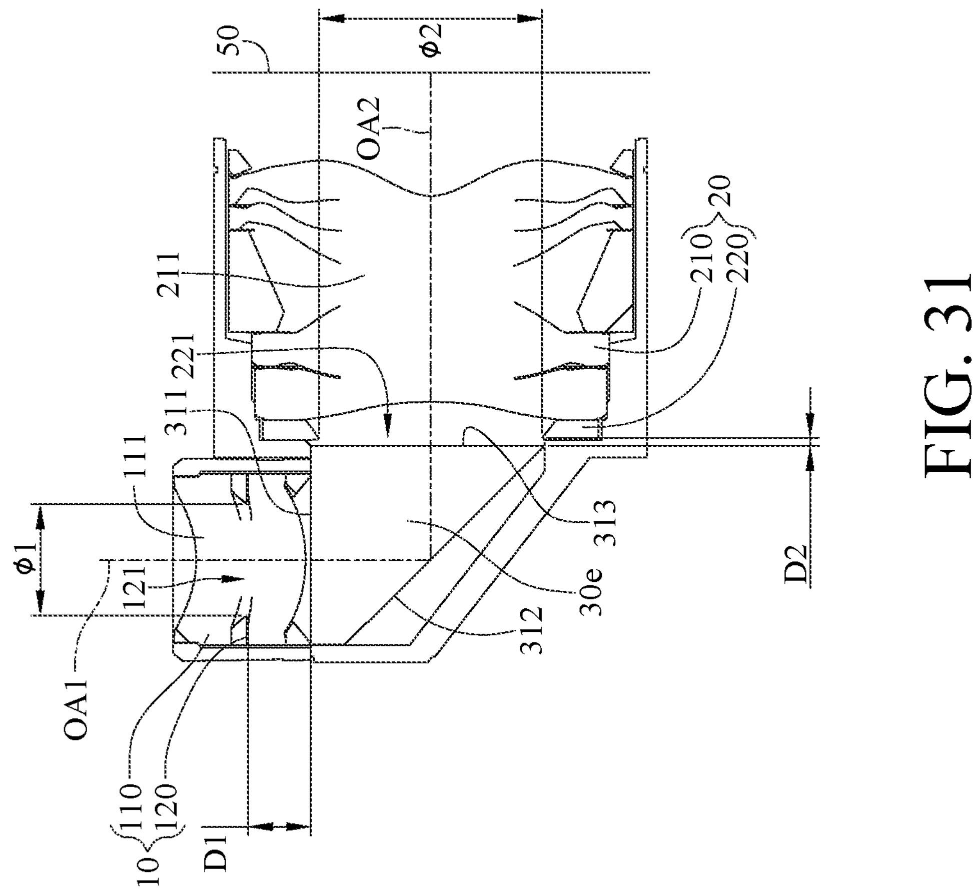
FIG. 31 is a cross-sectional view of the imaging lens module in FIG. 29.
Figure 32:
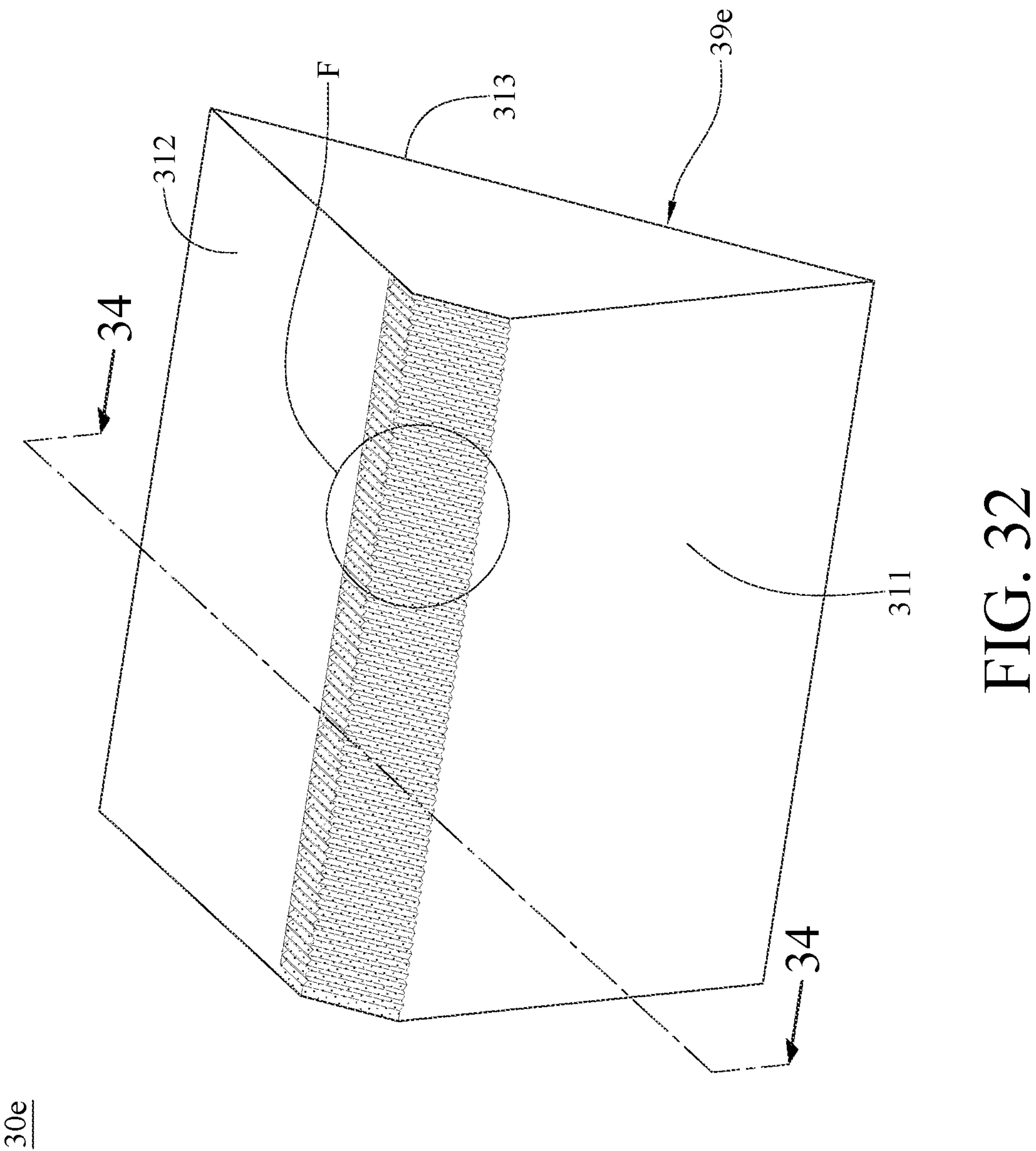
FIG. 32 is a perspective view of an optical path folding element of the imaging lens module in FIG. 29.
Figure 33:
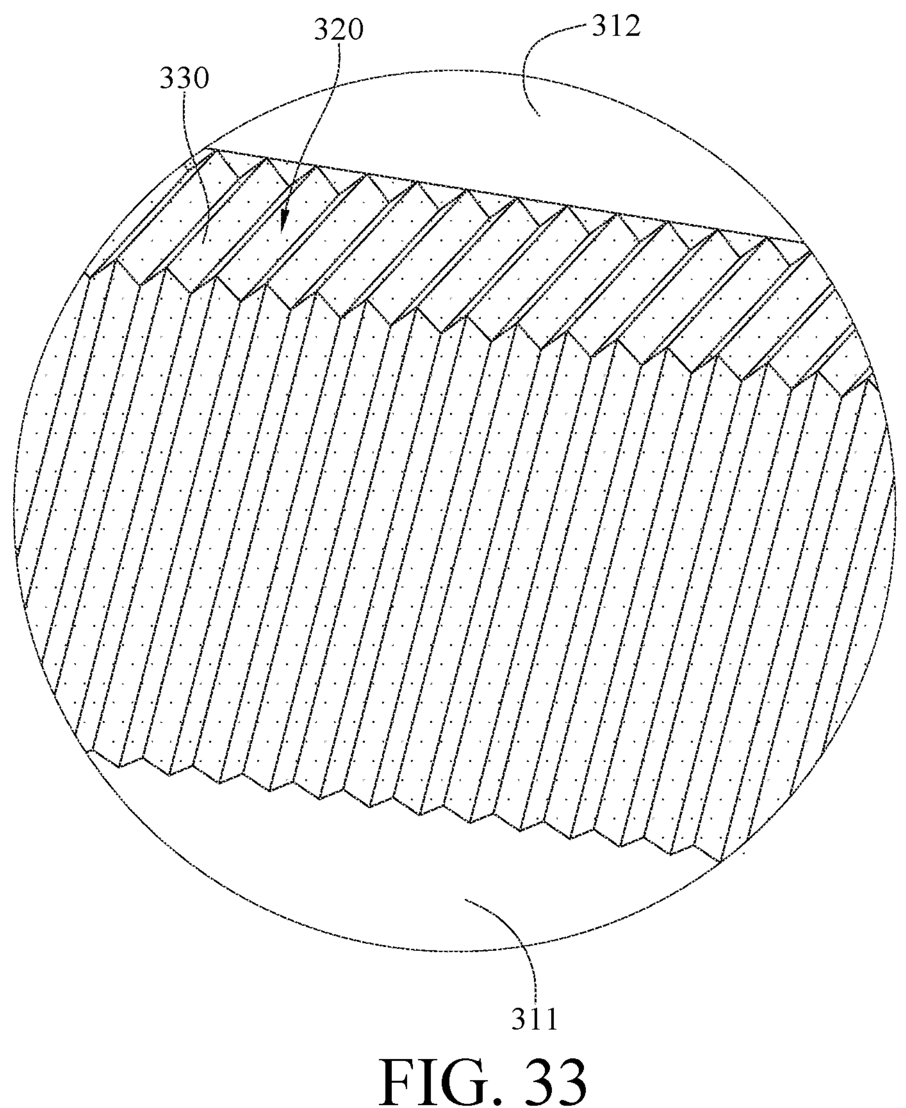
FIG. 33 is an enlarged view of a portion F of the optical path folding element in FIG. 32.
Figures 34, 35:
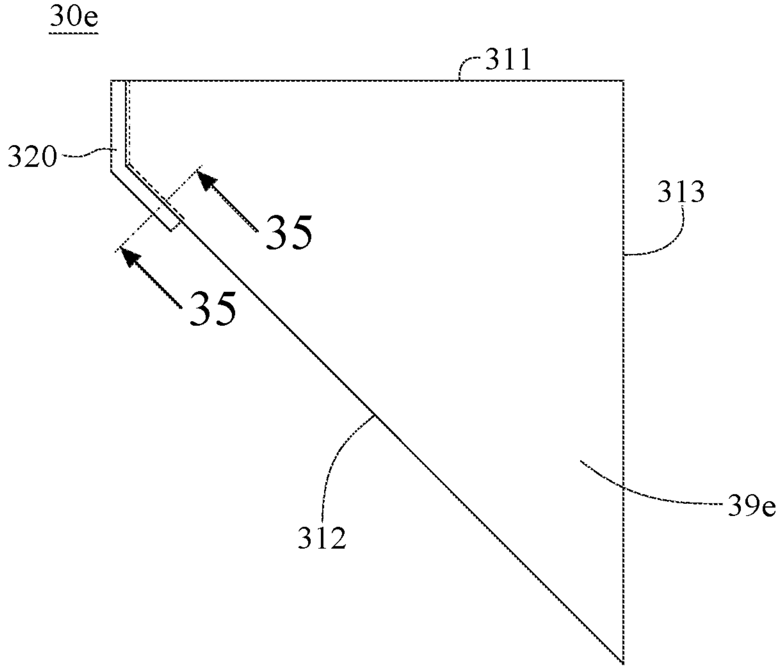
FIG. 34 is a cross-sectional view of the optical path folding element sectioned along line 34-34 in FIG. 32.
FIG. 35 is a cross-sectional view of the optical path folding element sectioned along line 35-35 in FIG. 34.

Please refer to FIG. 29 through FIG. 35, where FIG. 29 is a perspective view of an imaging lens module according to the 6th embodiment of the present disclosure, FIG. 30 is an exploded view of the imaging lens module in FIG. 29, FIG. 31 is a cross-sectional view of the imaging lens module in FIG. 29, FIG. 32 is a perspective view of an optical path folding element of the imaging lens module in FIG. 29, FIG. 33 is an enlarged view of a portion F of the optical path folding element in FIG. 32, FIG. 34 is a cross-sectional view of the optical path folding element sectioned along line 34-34 in FIG. 32, and FIG. 35 is a cross-sectional view of the optical path folding element sectioned along line 35-35 in FIG. 34.

In this embodiment, an imaging lens module 3 includes, in order an object side to an image side along an optical path from, a first lens assembly 10, an optical path folding element 30*e*, a second lens assembly 20 and an image surface 50.

The first lens assembly 10 is disposed at an object side of the optical path folding element 30*e*. The first lens assembly 10 includes a first lens element 110 and a first light blocking element 120. FIG. 31 shows multiple first lens elements 110, but the present is not limited to the number of the first lens element 110. Each of the first lens elements 110 includes a first optically effective portion 111, and the light can pass through the first optically effective portion 111. The first light blocking element 120 has a first light passing aperture 121. The first light passing aperture 121 is disposed corresponding to the optical path folding element 30*e*, and the light can pass through the first light passing aperture 121.

The first light passing aperture 121 is a smallest light passing aperture in the first lens assembly 10.

The second lens assembly 20 is disposed at an image side of the optical path folding element 30*d*. The second lens assembly 20 includes a second lens element 210 and a second light blocking element 220. FIG. 31 shows multiple second lens elements 210, but the present is not limited to the number of the second lens element 210. Each of the second lens elements 210 includes a second optically effective portion 211, and the light can pass through the second optically effective portion 211. The second light blocking element 220 has a second light passing aperture 221. The second light passing aperture 221 is disposed corresponding to the optical path folding element 30*e*, and the light can pass through the second light passing aperture 221. The second light passing aperture 221 is a smallest light passing aperture in the second lens assembly 20.

The optical path folding element 30*e* is disposed between the first lens assembly 10 and the second lens assembly 20. More specifically, the optical path folding element 30*e* is disposed at an image side of the first lens assembly 10 and an object side of the second lens assembly 20. The optical path folding element 30*e* can include a main body 39*e* served as a plastic prism, and the main body 39 has an optical surface 310. The optical surface 310 includes an incident surface 311, a reflective surface 312 and an emitting surface 313. The light enters into the optical path folding element 30*e* through the incident surface 311. The reflective surface 312 is configured to reflect the light so as to change a traveling direction thereof. The light exits the optical path folding element 30*e* through the emitting surface 313.

In this embodiment, the optical path folding element 30*e* further includes a light absorption film layer 320 configured to reduce reflectance. The light absorption film layer 320 is disposed adjacent to at least part of the optical surface 310, and the light absorption film layer 320 is in physical contact with the main body 39*e* of the optical path folding element 30*e*. In detail, the light absorption film layer 320 is disposed adjacent to the incident surface 311 and the reflective surface 312 of the optical surface 310, and the light absorption film layer 320 is in physical contact with surfaces of the main body 39*e* other than the optical surface 310.

In this embodiment, the light absorption film layer 320 includes a light absorbing film, and the light absorbing film includes a metal layer 3211 and a metal oxide layer 3212. The light absorbing film can consist of lamination of the metal layer 3211 and the metal oxide layer 3212. A primary element of the metal layer 3211 is Cr, a primary element of the metal oxide layer 3212 is represented by $MO_y$, where M is any one of Ta, Ti and Cr, and y satisfies the following condition: $y \leq 1$. The light absorbing film can be dark in appearance and can absorb visible light.

In this embodiment, the optical path folding element 30*e* further includes a matte structure 330, and the matte structure 330 is disposed adjacent to at least part of the optical surface 310. The matte structure 330 provides an undulating profile on a surface of the optical path folding element 30*e*, and the matte structure 330 is formed in one-piece with the main body 39*e* of the optical path folding element 30*e*. In this embodiment, the matte structure 330 includes concave and convex portions arranged at regular intervals, such as multiple striped depressions arranged linearly at regular intervals. The light absorption film layer 320 is disposed on the matte structure 330, and the matte structure 330 are disposed adjacent to the reflective surface 312 of the optical surface 310.

As shown in FIG. 31, the optical path passes along a first optical axis OA1 through the first lens assembly 10 and the incident surface 311 of the optical path folding element 30*e* to thereby reach the reflective surface 312. The optical path is deflected off the reflective surface 312 and then passes along a second optical axis OA2. The optical path passes along the second optical axis OA2 through the emitting surface 313 and the second lens assembly 20 to thereby reach the image surface 50.

In the first lens assembly 10 of this embodiment, when a minimum size of the first light passing aperture 121 is φ1, and a shortest vertical distance between the first light passing aperture 121 and the optical path folding element 30*e* is D1, the following condition is satisfied: φ1=1.96 mm; D1=1.11 mm; and φ1/(D1+1)=0.93.

In the second lens assembly 20 of this embodiment, when a minimum size of the second light passing aperture 221 is φ2, and a shortest vertical distance between the second light passing aperture 221 and the optical path folding element 30*e* is D2, the following condition is satisfied: φ2=3.92 mm; D2=0.14 mm; and φ2/(D2+1)=3.44.

7th Embodiment

Figure 36:
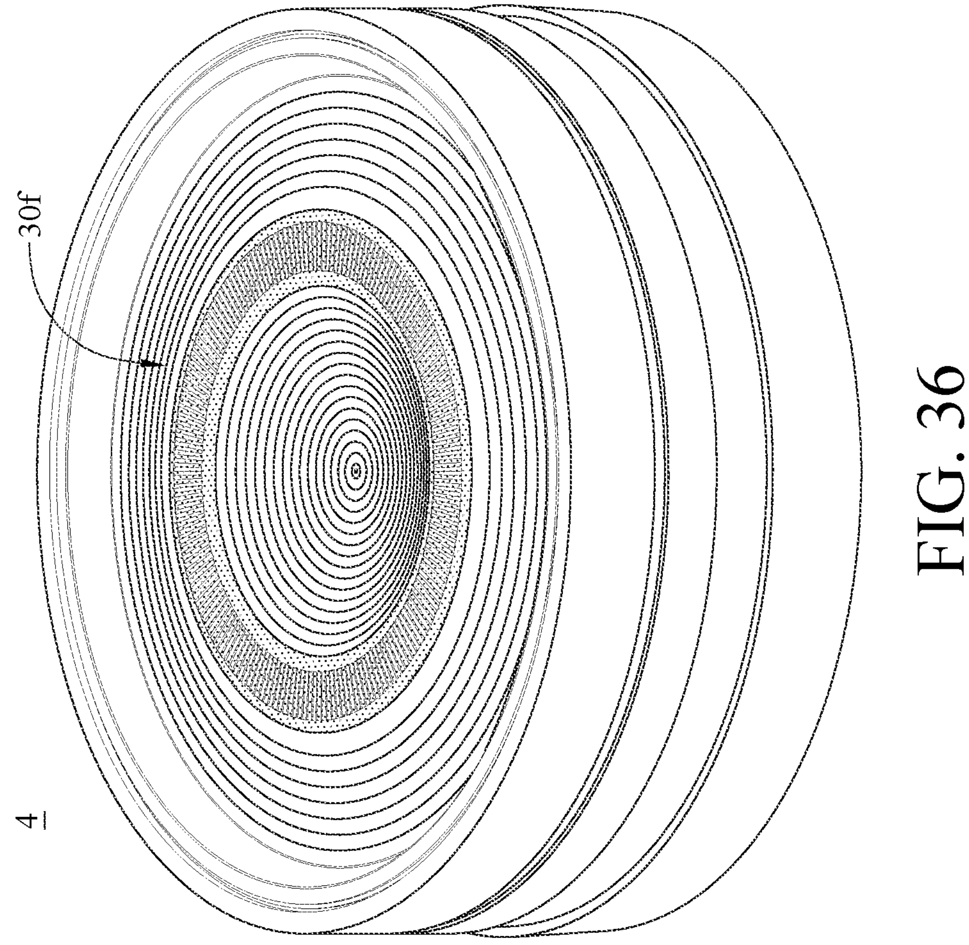
FIG. 36 is a perspective view of an imaging lens module according to the 7th embodiment of the present disclosure.
Figure 37:
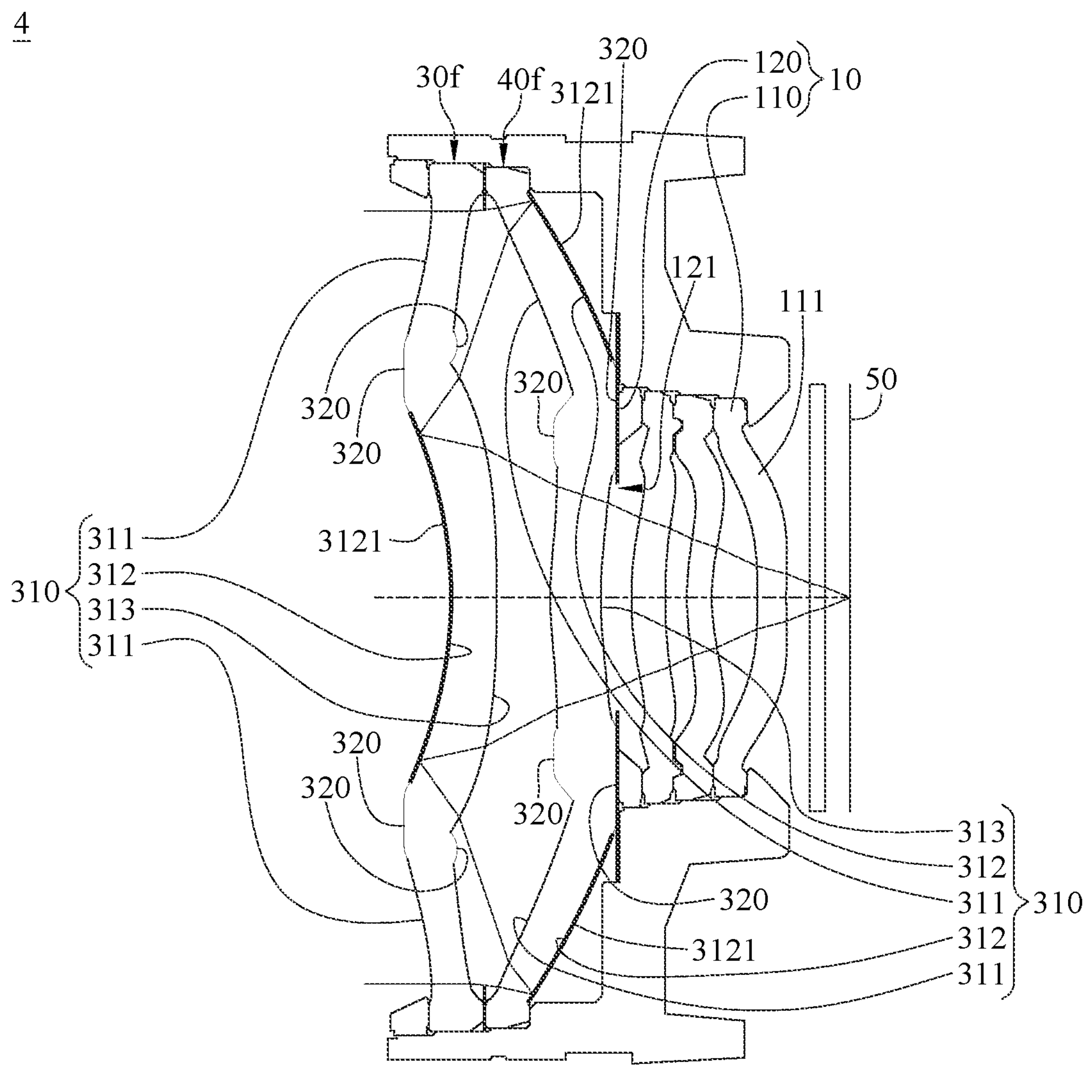
FIG. 37 is a cross-sectional view of the imaging lens module in FIG. 36.
Figure 38:
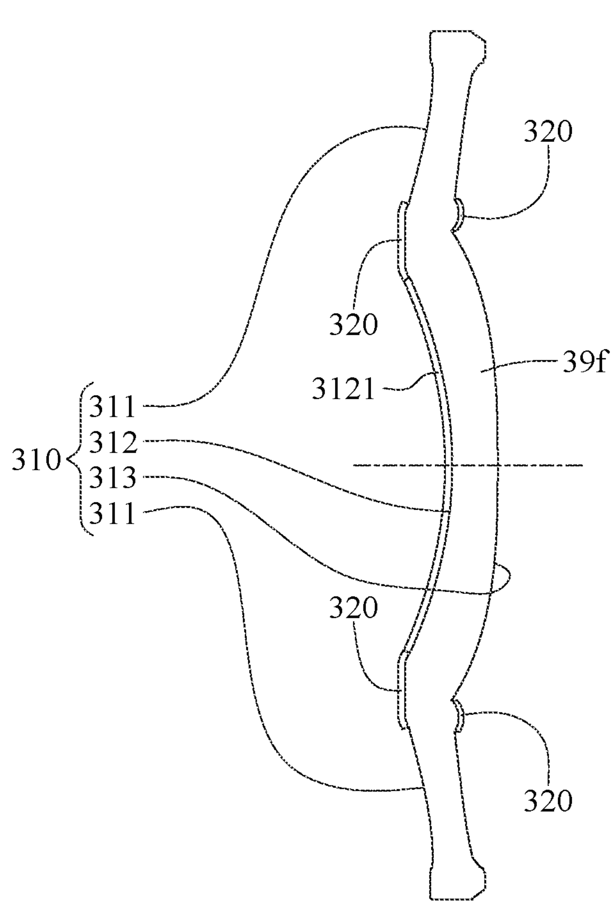
FIG. 38 is a schematic view of a first optical path folding element of the imaging lens module in FIG. 37.
Figure 39:
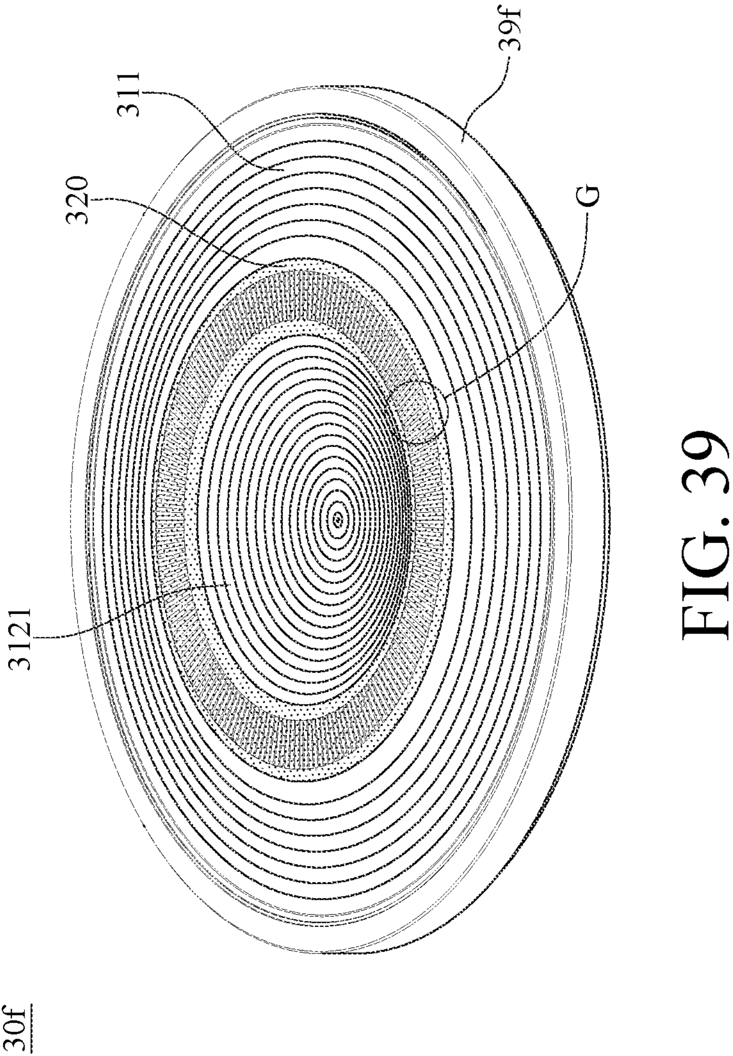
FIG. 39 is a perspective view of the first optical path folding element in FIG. 38.
Figure 40:
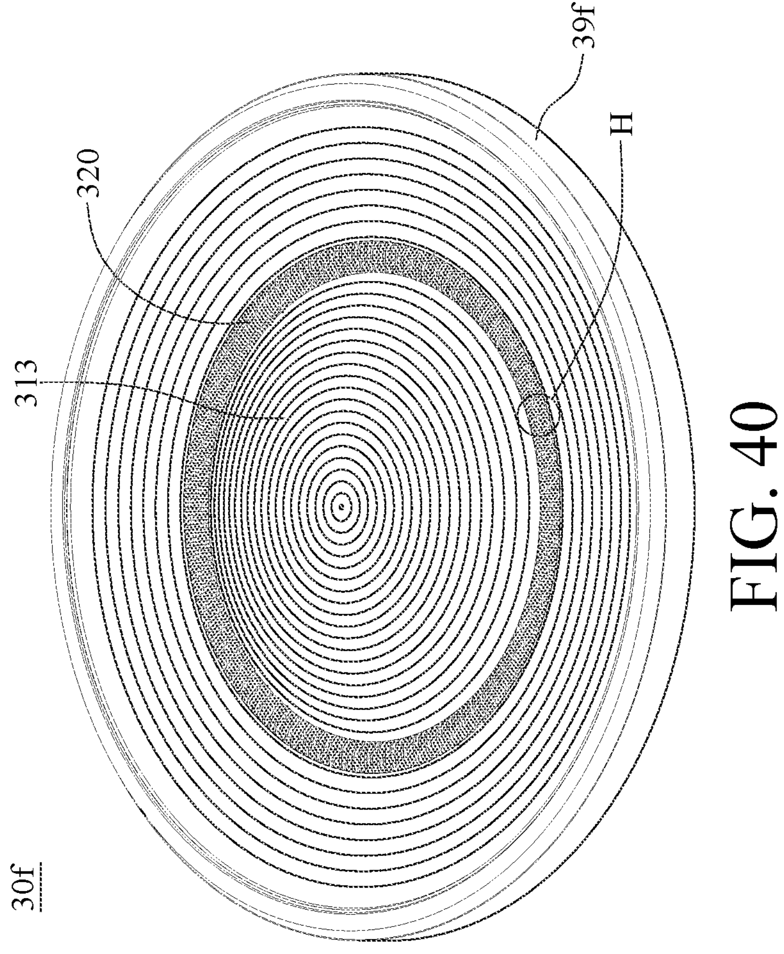
FIG. 40 is another perspective view of the first optical path folding element in FIG. 39.
Figure 41:
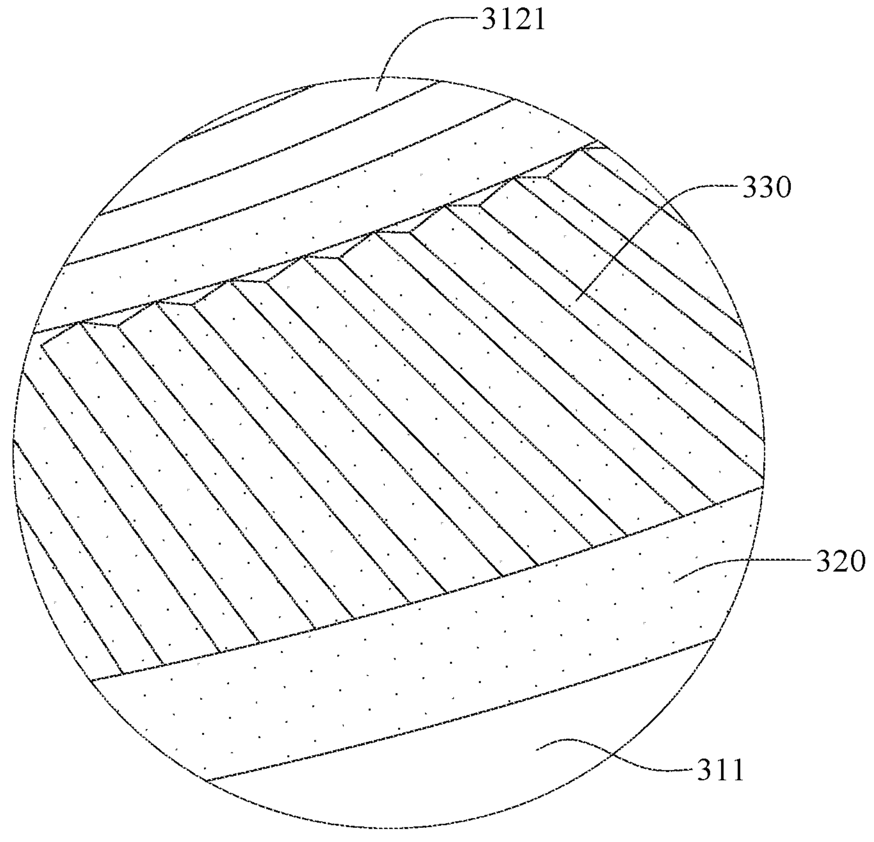
FIG. 41 is an enlarged view of a portion G of the first optical path folding element in FIG. 39.
Figure 42:
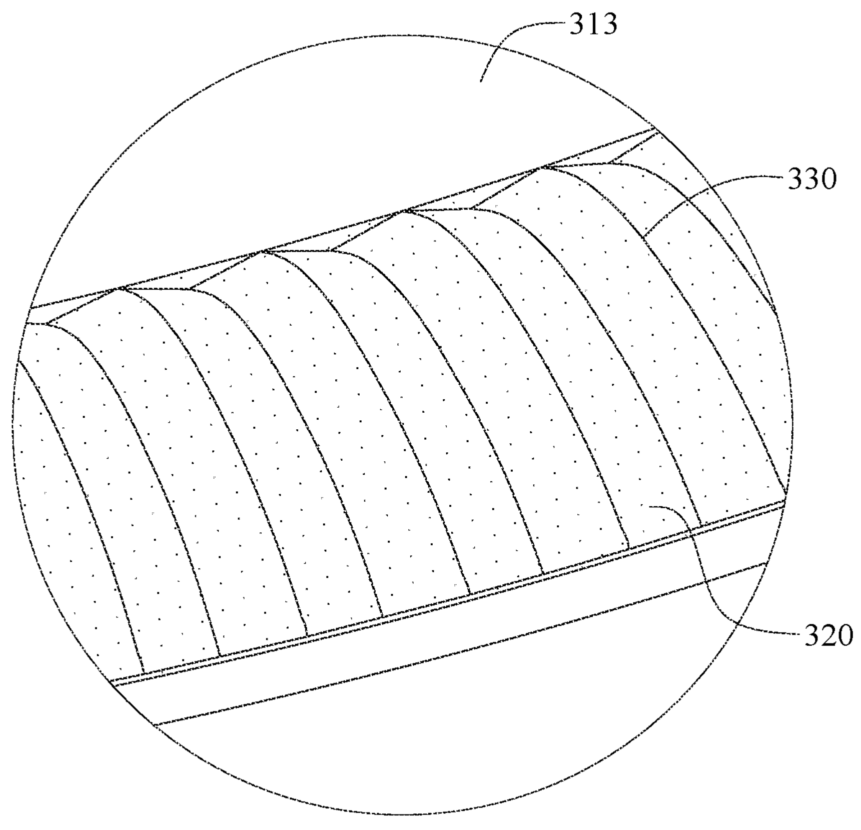
FIG. 42 is an enlarged view of a portion H at another side of the first optical path folding element in FIG. 40.
Figure 43:
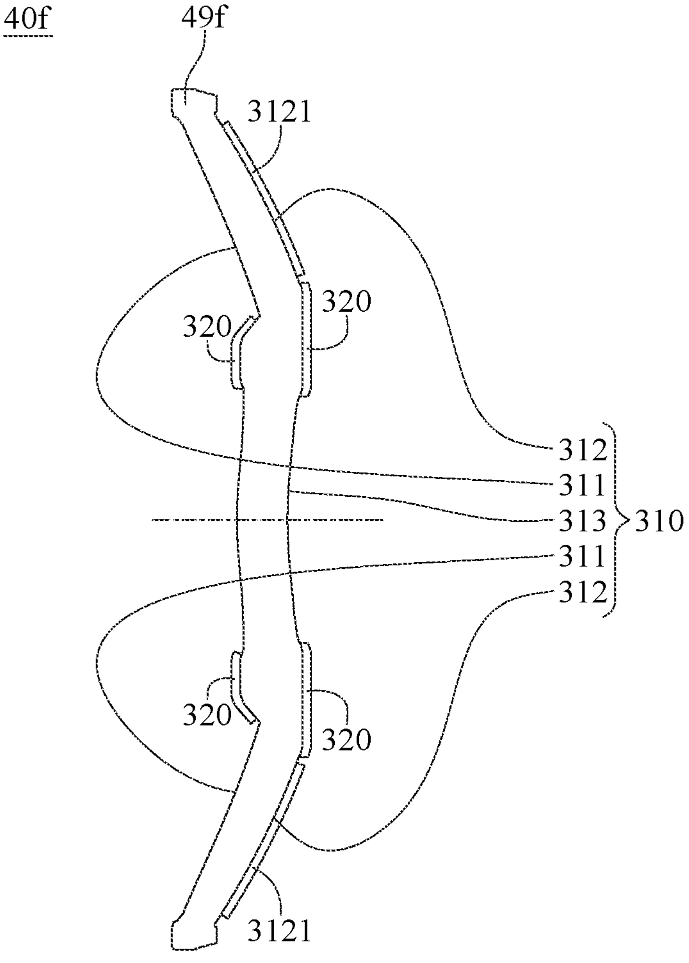
FIG. 43 is a schematic view of a second optical path folding element of the imaging lens module in FIG. 37.
Figure 44:
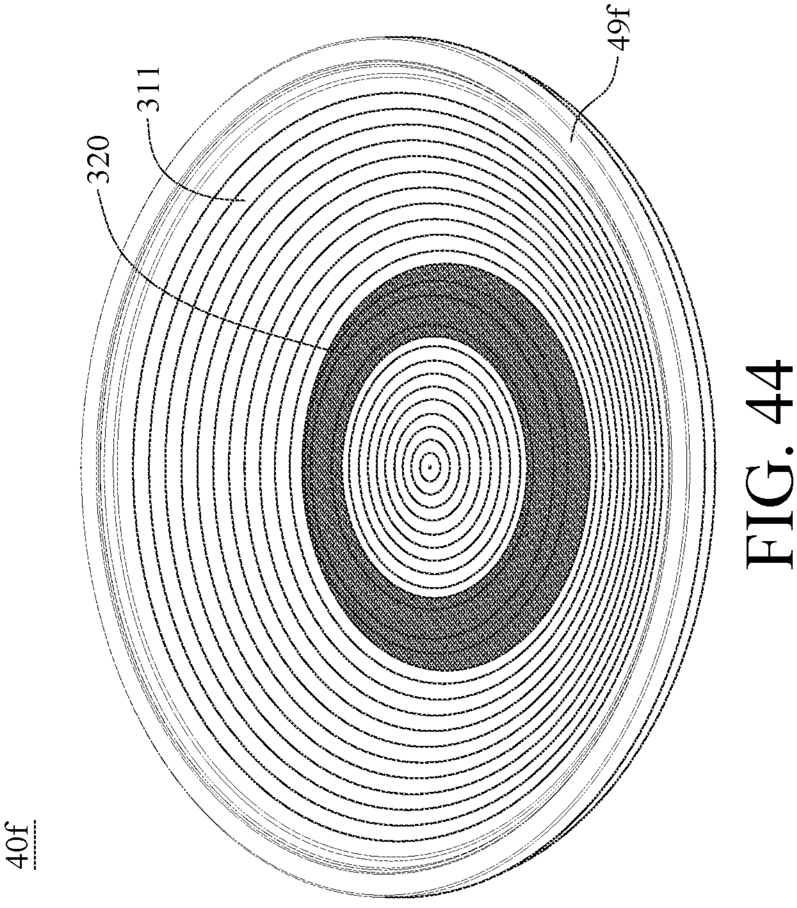
FIG. 44 is a perspective view of the second optical path folding element in FIG. 43.
Figure 45:
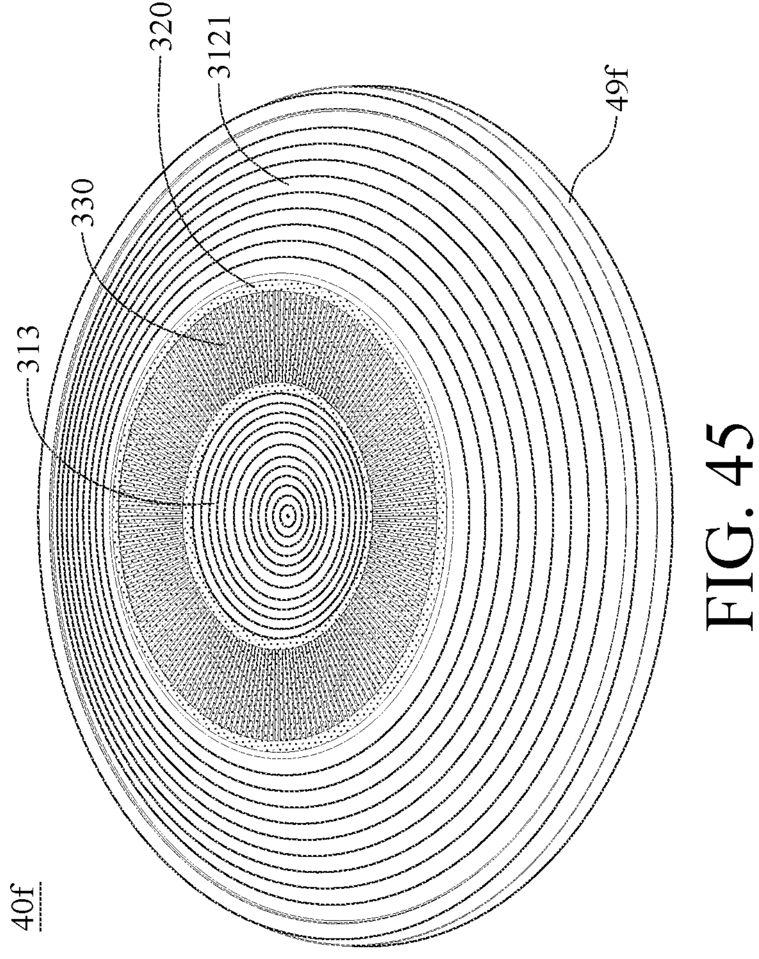
FIG. 45 is another perspective view of the second optical path folding element in FIG. 44.

Please refer to FIG. 36 through FIG. 45, where FIG. 36 is a perspective view of an imaging lens module according to the 7th embodiment of the present disclosure, FIG. 37 is a cross-sectional view of the imaging lens module in FIG. 36, FIG. 38 is a schematic view of a first optical path folding element of the imaging lens module in FIG. 37, FIG. 39 is a perspective view of the first optical path folding element in FIG. 38, FIG. 40 is another perspective view of the first optical path folding element in FIG. 39, FIG. 41 is an enlarged view of a portion G of the first optical path folding element in FIG. 39, FIG. 42 is an enlarged view of a portion H at another side of the first optical path folding element in FIG. 40, FIG. 43 is a schematic view of a second optical path folding element of the imaging lens module in FIG. 37, FIG. 44 is a perspective view of the second optical path folding element in FIG. 43, and FIG. 45 is another perspective view of the second optical path folding element in FIG. 44.

In this embodiment, an imaging lens module 4 includes, in order from an object side to an image side along an optical path, an optical path folding element 30*f*, a second optical path folding element 40*f*, a first lens assembly 10 and an image surface 50.

The first lens assembly 10 includes a first lens element 110 and a first light blocking element 120. FIG. 37 shows multiple first lens elements 110, but the present is not limited to the number of the first lens element 110. Each of the first lens elements 110 includes a first optically effective portion 111, and the light can pass through the first optically effective portion 111. The first light blocking element 120 has a first light passing aperture 121. The first light passing aperture 121 is disposed corresponding to the second optical path folding element 40*f*, and the light can pass through the first light passing aperture 121.

The optical path folding element 30*f* and the second optical path folding element 40*f* are disposed at an object side of the first lens assembly 10. Specifically, the optical path folding element 30*f* is disposed at the object side of the first lens assembly 10 and an object side of the second optical path folding element 40*f*. Moreover, the second optical path folding element 40*f* is disposed between the optical path folding element 30*f* and the first lens assembly 10. More specifically, the second optical path folding element 40*f* is disposed at the object side of the first lens assembly 10 and an image side of the optical path folding element 30*f*. The optical path folding element 30*f* and the second optical path folding element 40*f* can respectively include a main body 39*f* and a main body 49*f* made of glass or plastic.

Each of the main body 39*f* of the optical path folding element 30*f* and the main body 49*f* of the second optical path folding element 40 can have an optical surface 310, and the optical surface 310 includes an incident surface 311, a reflective surface 312 and an emitting surface 313. The light enters into the optical path folding element 30*f* (or the second optical path folding element 40*f*) through the incident surface 311. The reflective surface 312 is configured to reflect the light so as to change a traveling direction thereof. The light exits the optical path folding element 30*f* (or the second optical path folding element 40*f*) through the emitting surface 313. The reflective surface 312*s* coated with a reflective film 3121 for light reflection, and a primary element of the reflective film 3121 can include aluminum. In this embodiment, the reflective surface 312 of the optical path folding element 30*f* is in a paraxial region, and the reflective surface 312 of the second optical path folding element 40*f* is in an off-axis region.

In this embodiment, each of the optical path folding element 30*f* and the second optical path folding element 40*f* includes a light absorption film layer 320 configured to reduce reflectance. The light absorption film layer 320 is in physical contact with the main body 39*f* of the optical path folding element 30*f* or the main body 49*f* of the second optical path folding element 40*f*.

In this embodiment, the optical path folding element 30*f* further includes a matte structure 330, and the matte structure 330 is disposed adjacent to at least part of the optical surface 310. The matte structure 330 provides an undulating profile on a surface of the optical path folding element 30*f*, and the matte structure 330 is formed in one-piece with the main body 39*f* of the optical path folding element 30*f*. In this embodiment, the matte structure 330 includes concave and convex portions arranged at regular intervals. As shown in FIG. 39 and FIG. 41, the matte structure 330 includes multiple striped depressions around the reflective surface 312. As shown in FIG. 40 and FIG. 42, the matte structure 330 further includes multiple striped projections around the emitting surface 313. The light absorption film layer 320 is disposed on the matte structure 330, and the matte structure 330 is disposed adjacent to the reflective surface 312 and the emitting surface 313.

In this embodiment, the second optical path folding element 40*f* further includes a matte structure 330, and the matte structure 330 is disposed adjacent to at least part of the optical surface 310. The matte structure 330 provides an undulating profile on a surface of the second optical path folding element 40*f*, and the matte structure 330 is formed in one-piece with the main body 49*f* of the second optical path folding element 40*f*. As shown in FIG. 45, the matte structure 330 includes multiple striped projections around the emitting surface 313.

As shown in FIG. 37, the optical path passes through the optical path folding element 30*f* to thereby reach the reflective surface 312 of the second optical path folding element 40*f*. The optical path deflects off the reflective surface 312 and passes through the incident surface 311 of the second optical path folding element 40*f* and the emitting surface 313 of the optical path folding element 30*f* to thereby reach the reflective surface 312 of the optical path folding element 30*f*. The optical path deflects off the reflective surface 312 of the optical path folding element 30*f* and passes through the emitting surface 313 of the optical path folding element 30*f*, the emitting surface 313 of the second optical path folding element 40*f* and the first lens assembly 10 to thereby reach the image surface 50.

8th Embodiment

Figure 46:
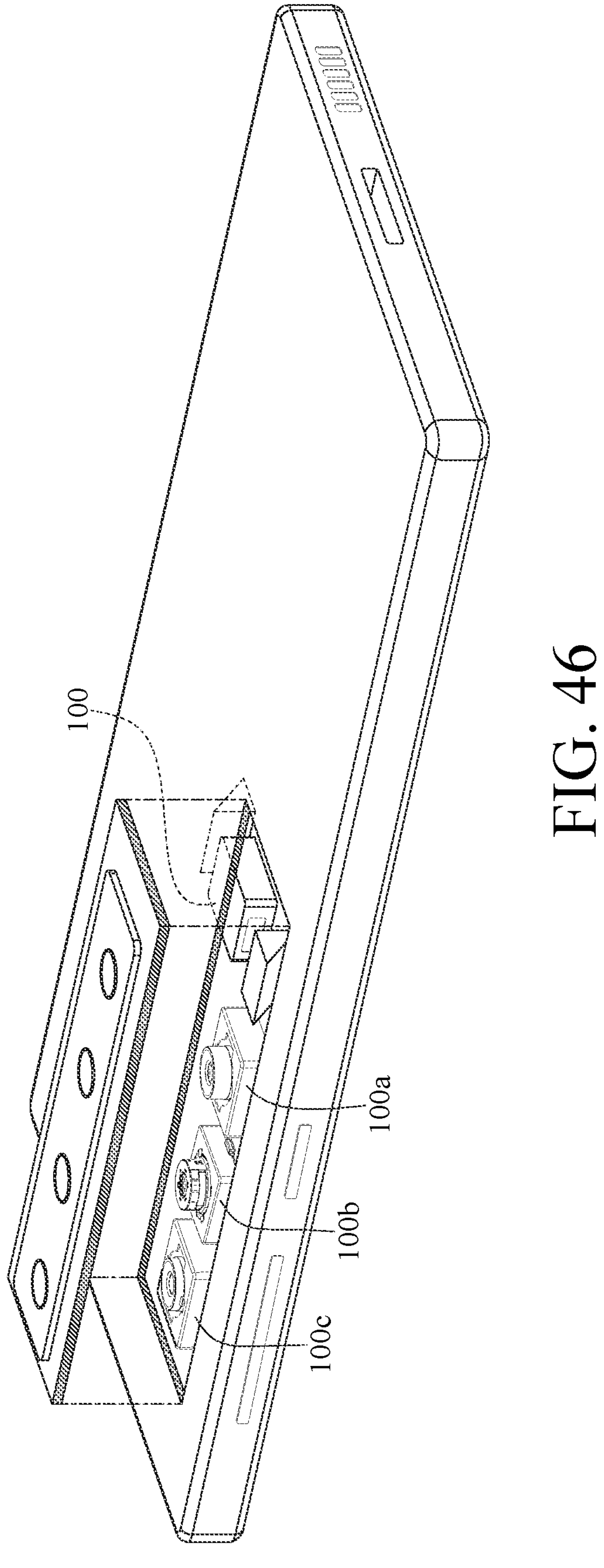
FIG. 46 is a perspective view of an electronic device according to the 8th embodiment of the present disclosure.

Please refer to FIG. 46, is a perspective view of an electronic device according to the 8th embodiment of the present disclosure.

In this embodiment, an electronic device 200 is a smartphone including an image capturing unit 100, an image capturing unit 100*a*, an image capturing unit 100*b* and an image capturing unit 100*c*. The image capturing unit 100, the image capturing unit 100*a*, the image capturing unit 100*b* and the image capturing unit 100*c* are disposed on the same side of the electronic device 200. The image capturing unit 100 includes the imaging lens module 1 disclosed in the 1st embodiment, and the image capturing unit 100 can have a light-folding configuration due to the presence of optical path folding element. The image capturing unit 100 also includes one or more of the imaging lens modules 2-4 disclosed in the other embodiments, but the present disclosure is not limited thereto. Furthermore, each of the image capturing units 100*a*, 100*b* and 100*c* can include the imaging lens module of the present disclosure and can have a light-folding configuration similar to that of the image capturing unit 100, and will not be repeated hereafter.

The image capturing unit 100 is an ultra-telephoto image capturing unit including optical path folding element, such as the optical path folding element 30 and the second optical path folding element 40 in the 1st embodiment. The image capturing unit 100*a* is a telephoto image capturing unit, the image capturing unit 100*b* is a wide-angle image capturing unit, and the image capturing unit 100*c* is an ultra-wide-angle image capturing unit. In this embodiment, the image capturing units 100, 100*a*, 100*b* and 100*c* have different fields of view, such that the electronic device 200 can have various magnification ratios so as to meet the requirement of optical zoom functionality for various applications with different requirements. For example, the image capturing unit 100 can have a field of view from 5 degrees to 30 degrees, the image capturing unit 100*a* can have a field of view from 30 degrees to 60 degrees, the image capturing unit 100*b* can have a field of view from 65 degrees to 90 degrees, the image capturing unit 100*c* can have a field of view from 93 degrees to 175 degrees. The specific fields of view for respective image capturing units are exemplary, and the present disclosure is not limited thereto.

In this embodiment, the electronic device 200 includes multiple image capturing units 100, 100*a*, 100*b* and 100*c*, but the present disclosure is not limited to the number and arrangement of image capturing units. When a user captures images of an object, the light rays converge in the image capturing unit 100, 100*a*, 100*b* or 100*c* to generate images.

9th Embodiment

Figure 47:
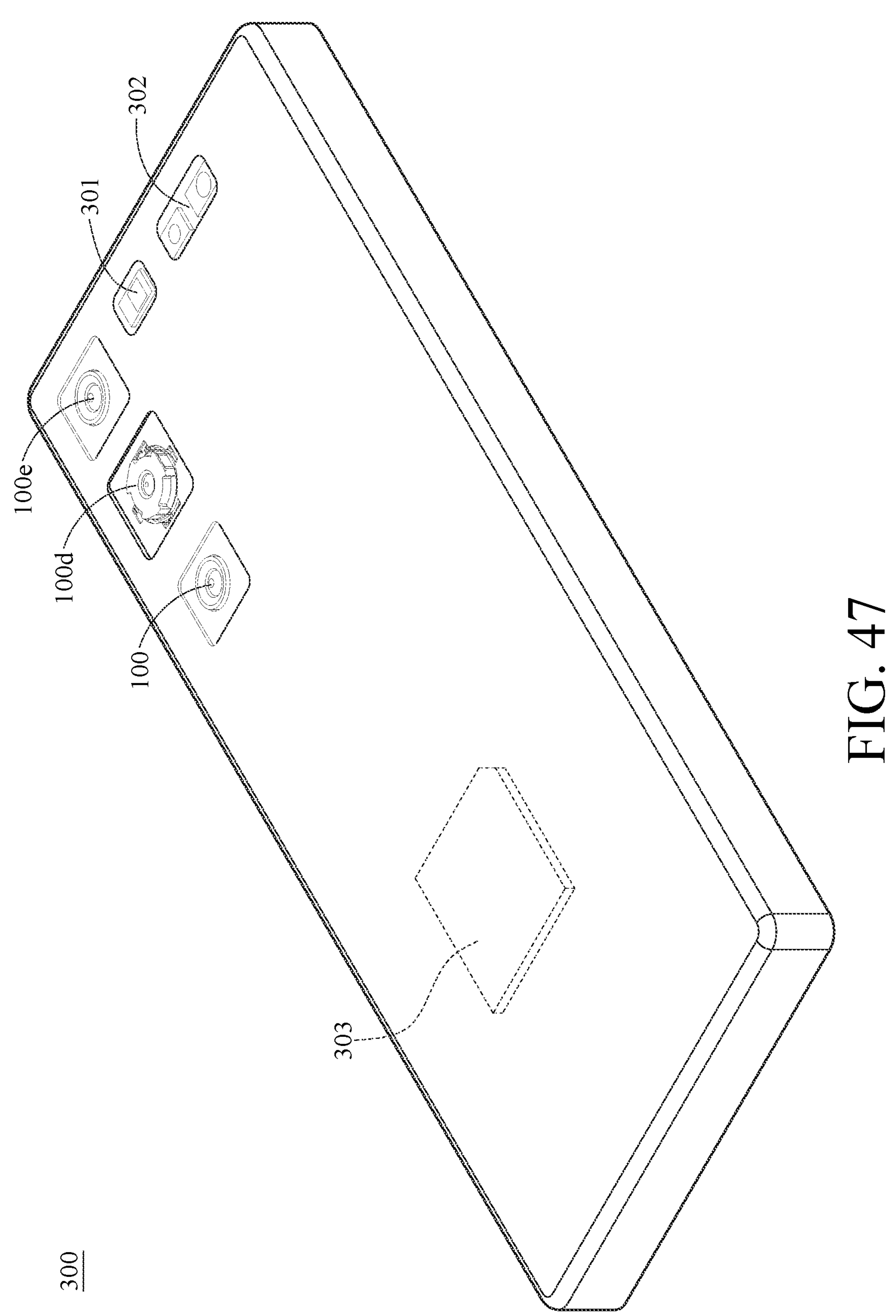
FIG. 47 is a perspective view of an electronic device according to the 9th embodiment of the present disclosure.
Figure 48:
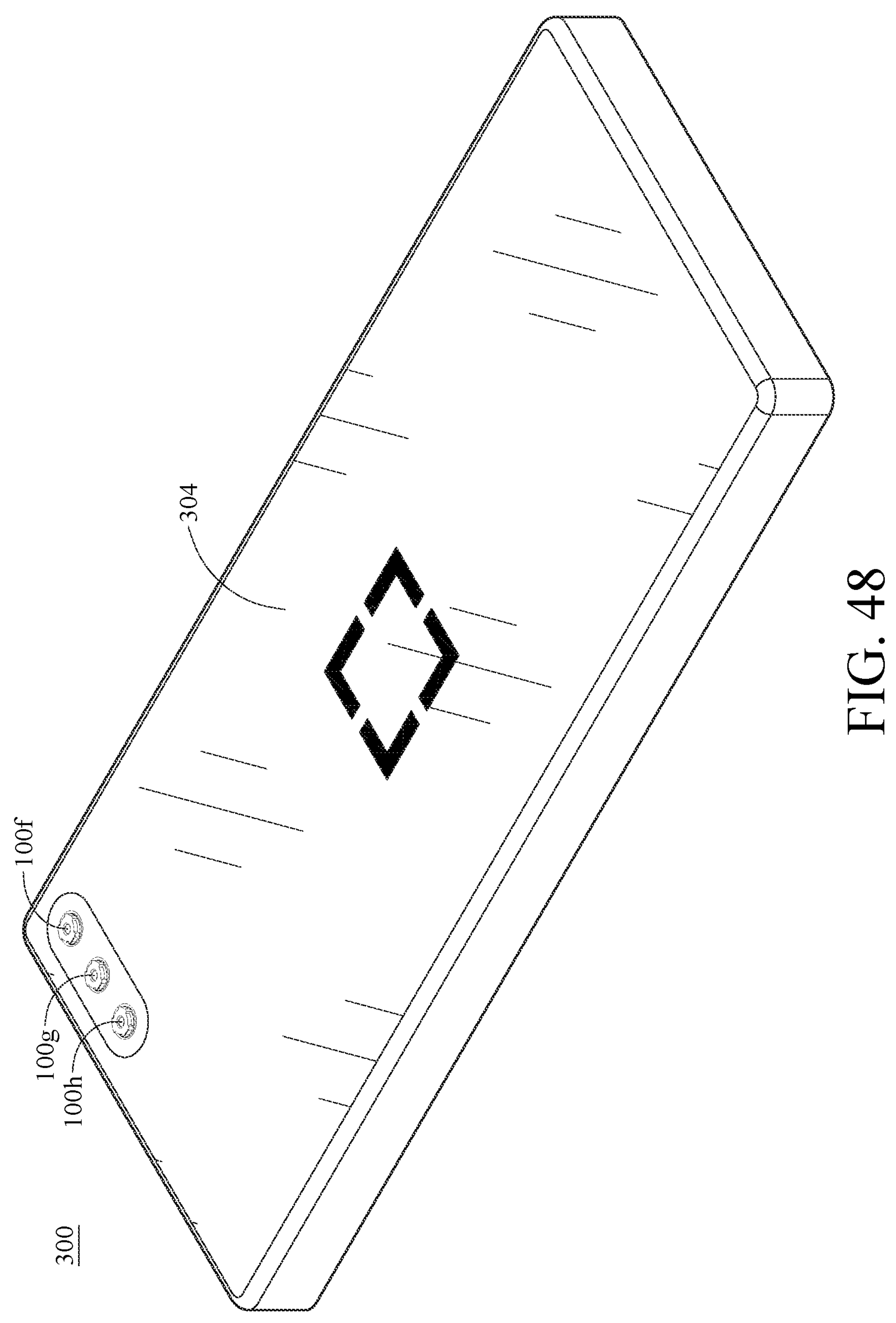
FIG. 48 is another perspective view of the electronic device in FIG. 47.
Figure 49:
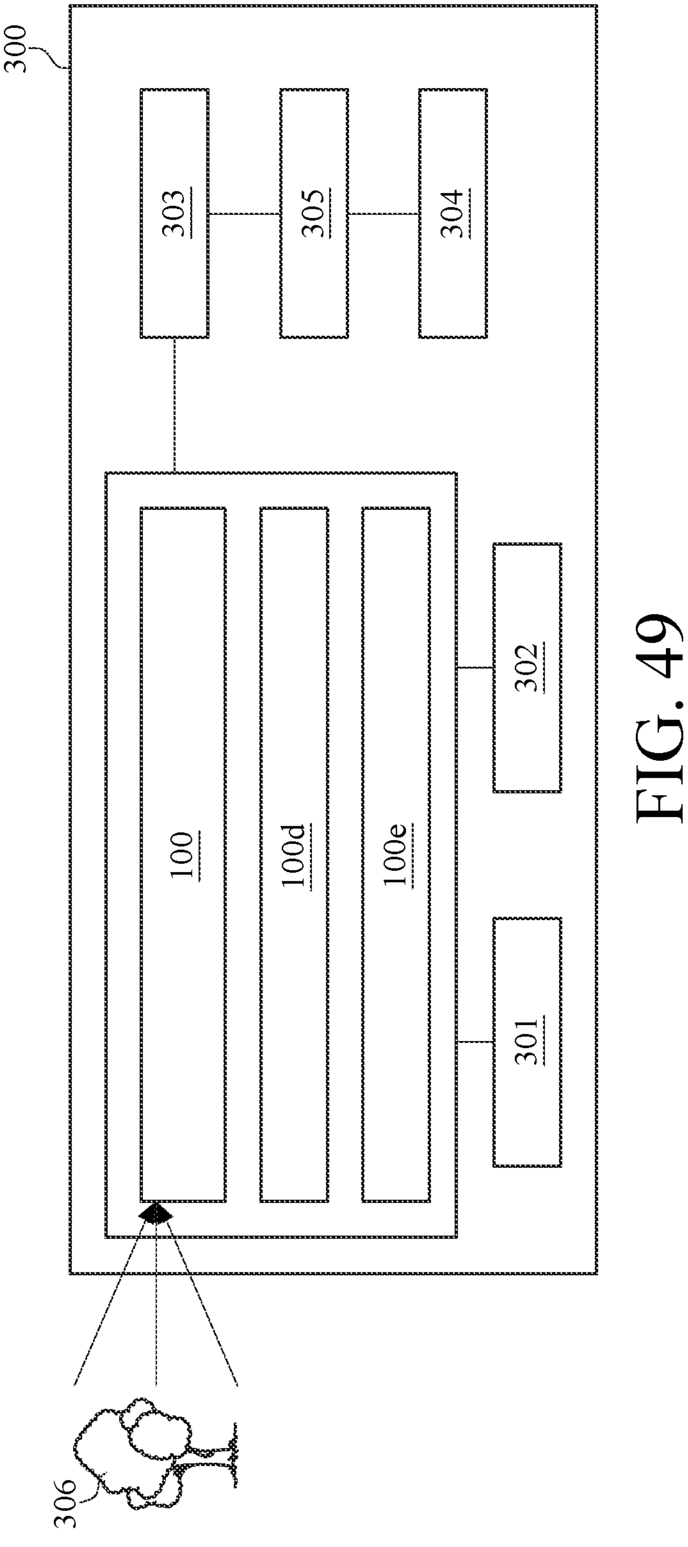
FIG. 49 is a block diagram of the electronic device in FIG. 47.

Please refer to FIG. 47 through FIG. 49, where FIG. 47 is a perspective view of an electronic device according to the 9th embodiment of the present disclosure, FIG. 48 is another perspective view of the electronic device in FIG. 47, and FIG. 49 is a block diagram of the electronic device in FIG. 47.

In this embodiment, an electronic device 300 is a smartphone including an image capturing unit 100, an image capturing unit 100*d*, an image capturing unit 100*e*, an image capturing unit 100*f*, an image capturing unit 100*g*, an image capturing unit 100*h*, a flash module 301, a focus assist module 302, an image signal processor 303, a display module 304 and an image software processor 305. The image capturing unit 100, the image capturing unit 100*d* and the image capturing unit 100*e* are disposed on the same side of the electronic device 300. The focus assist module 302 can be a laser rangefinder or a ToF (time of flight) module, but the present disclosure is not limited thereto. The image capturing unit 100*f*, the image capturing unit 100*g*, the image capturing unit 100*h* and the display module 304 are disposed on the opposite side of the electronic device 300, and the display module 304 can be a user interface, such that the image capturing units 100*f*, 100*g*, 100*h* can be front-facing cameras of the electronic device 300 for taking selfies, but the present disclosure is not limited thereto. Furthermore, each of the image capturing units 100, 100*d*, 100*e*, 100*f*, 100*g* and 100*h* can include the optical path folding element of the present disclosure. In detail, each of the image capturing units 100, 100*d*, 100*e*, 100*f*, 100*g* and 100*h* can include an imaging lens module of the present disclosure, a driving device, an image sensor and an image stabilizer, and can also include an optical path folding element.

The image capturing unit 100 is a telephoto image capturing unit, the image capturing unit 100*d* is a wide-angle image capturing unit, the image capturing unit 100*e* is an ultra-wide-angle image capturing unit, the image capturing unit 100*f* is a wide-angle image capturing unit, the image capturing unit 100*g* is an ultra-wide-angle image capturing unit, and the image capturing unit 100*h* is a ToF image capturing unit. In this embodiment, the image capturing units 100, 100*d* and 100*e* have different fields of view, such that the electronic device 300 can have various magnification ratios so as to meet the requirement of optical zoom functionality. In addition, the image capturing unit 100*h* can determine depth information of the imaged object. In this embodiment, the electronic device 300 includes multiple image capturing units 100, 100*d*, 100*e*, 100*f*, 100*g* and 100*h*, but the present disclosure is not limited to the number and arrangement of image capturing units.

When a user captures images of an object 306, the light rays converge in the image capturing unit 100, 100*d* or 100*e* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*f*, 100*g* or 100*h* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

The smartphone in these embodiments is only exemplary for showing the imaging lens module of the present disclosure installed in the electronic device, and the present disclosure is not limited thereto. The imaging lens module of the present disclosure can be optionally applied to optical systems with a movable focus. Furthermore, the imaging lens module of the present disclosure feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical path folding element, comprising:

a main body, having an optical surface comprising:

an incident surface, through which a light enters into the optical path folding element;

a reflective surface, configured to reflect the light so as to change a traveling direction thereof; and an emitting surface, through which the light exits the optical path folding element;

a light absorption film layer configured to reduce reflectance, wherein the light absorption film layer is disposed adjacent to at least part of the optical surface, and the light absorption film layer is in physical contact with the main body of the optical path folding element; and a matte structure, disposed adjacent to at least part of the optical surface;

wherein the matte structure provides an undulating profile on a surface of the optical path folding element, and the matte structure is formed in one-piece with the main body of the optical path folding element;

wherein at least part of the optical surface has a step structure at an edge thereof, and the step structure provides a convex shape or a concave shape on the optical surface with respect to a region proximal to the optical surface.

2. The optical path folding element according to claim 1, wherein the light absorption film layer is disposed adjacent to the reflective surface.

3. The optical path folding element according to claim 1, wherein the light absorption film layer comprises a light absorbing film, the light absorbing film comprises a metal layer, and a primary element of the metal layer is chromium.

4. The optical path folding element according to claim 3, wherein the light absorbing film further comprises a metal oxide layer, a primary element of the metal oxide layer is represented by $MO_y$, wherein M is any one of tantalum, titanium and chromium, and the following condition is satisfied:

$$y \leq 1.$$

5. The optical path folding element according to claim 3, wherein the light absorption film layer further comprises a first anti-reflective film, the first anti-reflective film is close to the main body of the optical path folding element with respect to the light absorbing film, the first anti-reflective film comprises a first high refractive layer and a first low refractive layer, the first high refractive layer has higher refractive index than the first low refractive layer, and the first high refractive layer is alternately laminated with the first low refractive layer.

6. The optical path folding element according to claim 5, wherein the light absorption film layer further comprises an interlayer, the interlayer is disposed between the first anti-reflective film and the light absorbing film, and the interlayer has same primary element as the first high refractive layer or the first low refractive layer.

7. The optical path folding element according to claim 6, wherein a primary element of the interlayer is $SiO_2$.

8. The optical path folding element according to claim 5, wherein the light absorption film layer further comprises a second anti-reflective film, the second anti-reflective film is far away from the main body of the optical path folding element with respect to the light absorbing film, the second anti-reflective film comprises a second high refractive layer and a second low refractive layer, the second high refractive layer has higher refractive index than the second low refractive layer, and the second high refractive layer is alternately laminated with the second low refractive layer.

9. The optical path folding element according to claim 1, wherein the matte structure is disposed adjacent to the reflective surface.

10. The optical path folding element according to claim 1, wherein the optical path folding element is made of plastic.

11. The optical path folding element according to claim 10, wherein concave and convex portions of the undulating profile provided by the matte structure are arranged at regular intervals.

12. The optical path folding element according to claim 1, wherein an edge profile of any one of the incident surface, the reflective surface and the emitting surface has a plurality of protrusions, the plurality of protrusions provide an extension of part of the edge profile of the optical surface in a direction away from a center of the optical surface.

13. The optical path folding element according to claim 1, further comprising a second reflective surface configured to reflect the light so as to change the traveling direction thereof.

14. An imaging lens module, comprising:

the optical path folding element according to claim 1;

a first lens assembly, disposed at an object side of the optical path folding element, and the first lens assembly comprising:

a first lens element, comprising a first optically effective portion through which the light passes; and a first light blocking element, having a first light passing aperture, wherein the first light passing aperture is disposed corresponding to the optical path folding element, and the light passes through the first light passing aperture; and an image surface, configured to receive the light;

wherein the first light passing aperture is a smallest light passing aperture in the first lens assembly, a minimum size of the first light passing aperture is φ1, a shortest vertical distance between the first light passing aperture and the optical path folding element is D1, and the following condition is satisfied:

$$0.2 \leq \varphi 1/(D1+1) \leq 9.$$

15. The imaging lens module according to claim 14, further comprising:

a second lens assembly, disposed at an image side of the optical path folding element, and the second lens assembly comprising:

a second lens element, comprising a second optically effective portion through which the light passes through; and a second light blocking element, having a second light passing aperture, wherein the second light passing aperture is disposed corresponding to the optical path folding element, and the light passes through the second light passing aperture;

wherein the second light passing aperture is a smallest light passing aperture in the second lens assembly, a minimum size of the second light passing aperture is φ2, a shortest vertical distance between the second light passing aperture and the optical path folding element is D2, and the following condition is satisfied:

$$0.3 \leq \varphi 2/(D2+1) \leq 12.$$

16. The imaging lens module according to claim 15, further comprising a second optical path folding element disposed at an image side of the second lens assembly.

17. An electronic device, comprising the optical path folding element according to any one of claim 1.

18. An optical path folding element, comprising:

a main body, having an optical surface comprising:

an incident surface, through which a light enters into the optical path folding element;

a reflective surface, configured to reflect the light so as to change a traveling direction thereof; and an emitting surface, through which the light exits the optical path folding element; and a light absorption film layer configured to reduce reflectance, wherein the light absorption film layer is disposed adjacent to at least part of the optical surface, and the light absorption film layer is in physical contact with the main body of the optical path folding element;

wherein the light absorption film layer comprises a first anti-reflective film and a light absorbing film that are arranged in sequence on the optical surface along a direction away from the main body, the first anti-reflective film is configured to reduce reflectance, the light absorbing film comprises a metal layer, and a primary element of the metal layer is chromium.

19. The optical path folding element according to claim 18, wherein the light absorption film layer is disposed adjacent to the reflective surface.

20. The optical path folding element according to claim 18, wherein at least part of the optical surface has a step structure at an edge thereof, and the step structure provides a convex shape or a concave shape on the optical surface with respect to a region proximal to the optical surface.

21. The optical path folding element according to claim 18, wherein the light absorbing film further comprises a metal oxide layer, a primary element of the metal oxide layer is represented by $MO_y$, wherein M is any one of tantalum, titanium and chromium, and y satisfies the following condition:

$$y \leq 1.$$

22. The optical path folding element according to claim 18, wherein the first anti-reflective film comprises a first high refractive layer and a first low refractive layer, the first high refractive layer has higher refractive index than the first low refractive layer, and the first high refractive layer is alternately laminated with the first low refractive layer.

23. The optical path folding element according to claim 22, wherein the light absorption film layer further comprises an interlayer, the interlayer is disposed between the first anti-reflective film and the light absorbing film, and the interlayer has same primary element as the first high refractive layer or the first low refractive layer.

24. The optical path folding element according to claim 22, wherein the light absorption film layer further comprises a second anti-reflective film, the second anti-reflective film is far away from the main body of the optical path folding element with respect to the light absorbing film, the second anti-reflective film comprises a second high refractive layer and a second low refractive layer, the second high refractive layer has higher refractive index than the second low refractive layer, and the second high refractive layer is alternately laminated with the second low refractive layer.

25. The optical path folding element according to claim 18, wherein the optical path folding element is made of plastic.

26. The optical path folding element according to claim 25, further comprising a matte structure, wherein the matte structure is disposed adjacent to at least part of the optical surface so as to provide an undulating profile on a surface of the optical path folding element with concave and convex portions thereof arranged at regular intervals, and the matte structure is formed in one-piece with the main body of the optical path folding element.

27. The optical path folding element according to claim 18, further comprising a second reflective surface configured to reflect the light so as to change the traveling direction thereof.

28. An imaging lens module, comprising:

the optical path folding element according to claim 18;

a first lens assembly, disposed at an object side of the optical path folding element, and the first lens assembly comprising:

a first lens element, comprising a first optically effective portion through which the light passes; and a first light blocking element, having a first light passing aperture, wherein the first light passing aperture is disposed corresponding to the optical path folding element, and the light passes through the first light passing aperture; and an image surface, configured to receive the light;

wherein the first light passing aperture is a smallest light passing aperture in the first lens assembly, a minimum size of the first light passing aperture is φ1, a shortest vertical distance between the first light passing aperture and the optical path folding element is D1, and the following condition is satisfied:

$$0.2 \leq \varphi 1/(D1+1) \leq 9.$$

29. The imaging lens module according to claim 28, further comprising:

a second lens assembly, disposed at an image side of the optical path folding element, and the second lens assembly comprising:

a second lens element, comprising a second optically effective portion through which the light passes through; and a second light blocking element, having a second light passing aperture, wherein the second light passing aperture is disposed corresponding to the optical path folding element, and the light passes through the second light passing aperture;

wherein the second light passing aperture is a smallest light passing aperture in the second lens assembly, a minimum size of the second light passing aperture is φ2, a shortest vertical distance between the second light passing aperture and the optical path folding element is D2, and the following condition is satisfied:

$$0.3 \leq \varphi 2/(D2+1) \leq 12.$$

30. The imaging lens module according to claim 29, further comprising a second optical path folding element disposed at an image side of the second lens assembly.

31. An electronic device, comprising the optical path folding element according to claim 18.

32. An optical path folding element, comprising:

a main body, having a reflective surface configured to reflect a light so as to change a traveling direction thereof; and a light absorption film layer configured to reduce reflectance, wherein the light absorption film layer is disposed adjacent to at least part of the reflective surface, and the light absorption film layer is in physical contact with the main body of the optical path folding element;

wherein the light absorption film layer comprises a light absorbing film, and the light absorbing film comprises:

a metal layer, wherein a primary element of the metal layer is chromium; and a metal oxide layer, wherein a primary element of the metal oxide layer is represented by $MO_y$;

wherein M is any one of tantalum, titanium and chromium, and y satisfies the following condition:

$$y \leq 1;$$

wherein the light absorption film layer further comprises a first anti-reflective film, the first anti-reflective film is close to the main body of the optical path folding element with respect to the light absorbing film, the first anti-reflective film comprises a first high refractive layer and a first low refractive layer, the first high refractive layer has higher refractive index than the first low refractive layer, and the first high refractive layer is alternately laminated with the first low refractive layer.

33. The optical path folding element according to claim 32, wherein the light absorption film layer further comprises an interlayer, the interlayer is disposed between the first anti-reflective film and the light absorbing film, and the interlayer has same primary element as the first high refractive layer or the first low refractive layer.

34. The optical path folding element according to claim 33, wherein a primary element of the interlayer is $SiO_2$.

35. The optical path folding element according to claim 32, wherein the light absorption film layer further comprises a second anti-reflective film, the second anti-reflective film is far away from the main body of the optical path folding element with respect to the light absorbing film, the second anti-reflective film comprises a second high refractive layer and a second low refractive layer, the second high refractive layer has higher refractive index than the second low refractive layer, and the second high refractive layer is alternately laminated with the second low refractive layer.

36. The optical path folding element according to claim 32, further comprising a matte structure, wherein the matte structure is disposed adjacent to at least part of the reflective surface so as to provide an undulating profile on a surface of the optical path folding element with concave and convex portions thereof arranged at regular intervals, and the matte structure is formed in one-piece with the main body of the optical path folding element.

37. The optical path folding element according to claim 32, wherein an edge profile of the reflective surface has a plurality of protrusions, the plurality of protrusions provide an extension of part of the edge profile of the reflective surface in a direction away from a center of the optical surface.

38. An imaging lens module, comprising:

the optical path folding element according to claim 32;

a first lens assembly, disposed at an object side of the optical path folding element, and the first lens assembly comprising:

a first lens element, comprising a first optically effective portion through which the light passes; and a first light blocking element, having a first light passing aperture, wherein the first light passing aperture is disposed corresponding to the optical path folding element, and the light passes through the first light passing aperture; and an image surface, configured to receive the light;

wherein the first light passing aperture is a smallest light passing aperture in the first lens assembly, a minimum size of the first light passing aperture is φ1, a shortest vertical distance between the first light passing aperture and the optical path folding element is D1, and the following condition is satisfied:

$$0.2 \leq \varphi 1/(D1+1) \leq 9.$$

39. The imaging lens module according to claim 38, further comprising:

a second lens assembly, disposed at an image side of the optical path folding element, and the second lens assembly comprising:

a second lens element, comprising a second optically effective portion through which the light passes through; and a second light blocking element, having a second light passing aperture, wherein the second light passing aperture is disposed corresponding to the optical path folding element, and the light passes through the second light passing aperture;

wherein the second light passing aperture is a smallest light passing aperture in the second lens assembly, a minimum size of the second light passing aperture is φ2, a shortest vertical distance between the second light passing aperture and the optical path folding element is D2, and the following condition is satisfied:

$$0.3 \leq \varphi 2/(D2+1) \leq 12.$$

40. An electronic device, comprising the optical path folding element according to claim 32.

41. An optical path folding element, comprising:

a main body, having an optical surface comprising:

an incident surface, through which a light enters into the optical path folding element;

a reflective surface, configured to reflect the light so as to change a traveling direction thereof, and an emitting surface, through which the light exits the optical path folding element; and a matte structure, disposed adjacent to at least part of the optical surface so as to provide an undulating profile on a surface of the optical path folding element, and the matte structure is formed in one-piece with the main body of the optical path folding element;

wherein at least part of the optical surface has a step structure at an edge thereof, and the step structure provides a convex shape or a concave shape on the optical surface with respect to a region proximal to the optical surface.

42. The optical path folding element according to claim 41, further comprising:

a light absorption film layer configured to reduce reflectance, wherein the light absorption film layer is disposed adjacent to at least part of the optical surface, and the light absorption film layer is in physical contact with the main body of the optical path folding element.

43. The optical path folding element according to claim 42, wherein the light absorption film layer is disposed adjacent to the reflective surface.

44. The optical path folding element according to claim 42, wherein the light absorption film layer comprises a light absorbing film, the light absorbing film comprises a metal layer, and a primary element of the metal layer is chromium.

45. The optical path folding element according to claim 44, wherein the light absorbing film further comprises a metal oxide layer, a primary element of the metal oxide layer is represented by $MO_y$, wherein M is any one of tantalum, titanium and chromium, and the following condition is satisfied:

$$y \leq 1.$$

46. The optical path folding element according to claim 42, wherein the light absorption film layer further comprises a first anti-reflective film, the first anti-reflective film is close to the main body of the optical path folding element with respect to the light absorbing film, the first anti-reflective film comprises a first high refractive layer and a first low refractive layer, the first high refractive layer has higher refractive index than the first low refractive layer, and the first high refractive layer is alternately laminated with the first low refractive layer.

47. The optical path folding element according to claim 46, wherein the light absorption film layer further comprises an interlayer, the interlayer is disposed between the first anti-reflective film and the light absorbing film, and the interlayer has same primary element as the first high refractive layer or the first low refractive layer.

48. The optical path folding element according to claim 46, wherein the light absorption film layer further comprises a second anti-reflective film, the second anti-reflective film is far away from the main body of the optical path folding element with respect to the light absorbing film, the second anti-reflective film comprises a second high refractive layer and a second low refractive layer, the second high refractive layer has higher refractive index than the second low refractive layer, and the second high refractive layer is alternately laminated with the second low refractive layer.

49. The optical path folding element according to claim 41, wherein the matte structure is disposed adjacent to the reflective surface.

50. The optical path folding element according to claim 41, wherein concave and convex portions of the undulating profile provided by the matte structure are arranged at regular intervals.

51. The optical path folding element according to claim 41, wherein an edge profile of the reflective surface has a plurality of protrusions, the plurality of protrusions provide an extension of part of the edge profile of the reflective surface in a direction away from a center of the optical surface.

52. An imaging lens module, comprising:

the optical path folding element according to claim 41;

a first lens assembly, disposed at an object side of the optical path folding element, and the first lens assembly comprising:

a first lens element, comprising a first optically effective portion through which the light passes; and a first light blocking element, having a first light passing aperture, wherein the first light passing aperture is disposed corresponding to the optical path folding element, and the light passes through the first light passing aperture; and an image surface, configured to receive the light;

wherein the first light passing aperture is a smallest light passing aperture in the first lens assembly, a minimum size of the first light passing aperture is φ1, a shortest vertical distance between the first light passing aperture and the optical path folding element is D1, and the following condition is satisfied:

$$0.2 \leq \varphi 1/(D1+1) \leq 9.$$

53. The imaging lens module according to claim 52, further comprising:

a second lens assembly, disposed at an image side of the optical path folding element, and the second lens assembly comprising:

a second lens element, comprising a second optically effective portion through which the light passes through; and a second light blocking element, having a second light passing aperture, wherein the second light passing aperture is disposed corresponding to the optical path folding element, and the light passes through the second light passing aperture;

wherein the second light passing aperture is a smallest light passing aperture in the second lens assembly, a minimum size of the second light passing aperture is φ2, a shortest vertical distance between the second light passing aperture and the optical path folding element is D2, and the following condition is satisfied:

$$0.3 \leq \varphi 2/(D2+1) \leq 12.$$

54. The imaging lens module according to claim 53, further comprising a second optical path folding element disposed at an image side of the second lens assembly.

55. An electronic device, comprising the optical path folding element according to claim 41.

* * * * *